(12) United States Patent
Hawkins et al.

(10) Patent No.: US 8,135,611 B2
(45) Date of Patent: *Mar. 13, 2012

(54) SYSTEM AND METHOD FOR MANAGING ASSET INSTALLATION AND EVALUATION

(75) Inventors: Stan Hawkins, Snellville, GA (US); Thomas Swiedler, Roswell, GA (US); Charles Turner, Jacksonville, FL (US)

(73) Assignee: Reflexis Systems, Inc., Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/031,238

(22) Filed: Feb. 20, 2011

(65) Prior Publication Data

US 2011/0288966 A1 Nov. 24, 2011

Related U.S. Application Data

(63) Continuation of application No. 11/323,562, filed on Dec. 30, 2005, now Pat. No. 7,957,990.

(51) Int. Cl.
*G06Q 10/00* (2006.01)
(52) U.S. Cl. ...................... 705/7.42; 705/7.38
(58) Field of Classification Search ................ 705/7.38, 705/7.42

See application file for complete search history.

(56) References Cited

U.S. PATENT DOCUMENTS

| | | |
|---|---|---|
| 5,644,723 A | 7/1997 | Deaton et al. |
| 5,677,955 A | 10/1997 | Doggett et al. |
| 5,737,701 A | 4/1998 | Rosenthal et al. |
| 5,774,551 A | 6/1998 | Wu et al. |
| 5,794,259 A | 8/1998 | Kikinis |
| 5,815,665 A | 9/1998 | Teper et al. |
| 5,855,007 A | 12/1998 | Jovicic et al. |
| 5,872,850 A | 2/1999 | Klein et al. |
| 5,911,141 A | 6/1999 | Kelley et al. |

(Continued)

FOREIGN PATENT DOCUMENTS

WO WO 01/46783 2/2001

OTHER PUBLICATIONS

Hargis, Network Quality: Proving your point, Cellular Business, vol. 12, No. 9, Sep. 1995, p. 50-54 (online reprint p. 1-3).*

(Continued)

*Primary Examiner* — Justin M Pats
(74) *Attorney, Agent, or Firm* — Smith Risley; Steven P. Wigmore

(57) ABSTRACT

Efficient and effective centralized management of automated field force installation and evaluation of assets. Service representatives can each perform an asset installation and/or an asset evaluation with the aid of a handheld device. The handheld device can display worksheets comprising a sequence of instructions and prompts related to the installation/evaluation. In performing the asset installation/evaluation, the service representative can follow the instructions and enter responses to the prompts into the handheld device. The handheld device can communicate with a server to download the worksheets onto the handheld device and to upload from the handheld device data related to the installation/evaluation. Authorized users' network devices can interact with a reporting module of the server to generate reports based on the uploaded data. The reports can provide the authorized users with real-time or near real-time information about the service representatives' performance and about particular assets, including, e.g., information about particular asset installations/evaluations.

13 Claims, 15 Drawing Sheets

U.S. PATENT DOCUMENTS

| | | | |
|---|---|---|---|
| 5,983,208 | A | 11/1999 | Haller et al. |
| 6,005,939 | A | 12/1999 | Fortenberry et al. |
| 6,052,710 | A | 4/2000 | Saliba et al. |
| 6,073,106 | A | 6/2000 | Rozen et al. |
| 6,125,352 | A | 9/2000 | Franklin et al. |
| 6,154,768 | A | 11/2000 | Chen et al. |
| 6,192,380 | B1 | 2/2001 | Light et al. |
| 6,199,079 | B1 | 3/2001 | Gupta et al. |
| 6,208,659 | B1 | 3/2001 | Govindarajan et al. |
| 6,233,608 | B1 | 5/2001 | Laursen et al. |
| 6,243,688 | B1 | 6/2001 | Kalina |
| 6,247,029 | B1 | 6/2001 | Kelley et al. |
| 6,253,203 | B1 | 6/2001 | O'Flaherty et al. |
| 6,298,347 | B1 | 10/2001 | Wesley |
| 6,321,339 | B1 | 11/2001 | French et al. |
| 6,356,905 | B1 | 3/2002 | Gershman et al. |
| 6,385,596 | B1 | 5/2002 | Wiser et al. |
| 6,401,085 | B1 | 6/2002 | Gershman et al. |
| 6,491,217 | B2 | 12/2002 | Catan |
| 6,571,279 | B1 | 5/2003 | Herz et al. |
| 6,571,285 | B1 | 5/2003 | Groath et al. |
| 6,584,448 | B1 | 6/2003 | Laor |
| 6,665,704 | B1 | 12/2003 | Singh |
| 6,725,050 | B1 | 4/2004 | Cook |
| 6,845,370 | B2 | 1/2005 | Burkey et al. |
| 7,148,800 | B2 * | 12/2006 | Cunningham et al. .... 340/539.11 |
| 7,313,759 | B2 * | 12/2007 | Sinisi ............................ 715/203 |
| 7,356,495 | B2 * | 4/2008 | Beigl et al. ...................... 705/28 |
| 7,817,063 | B2 * | 10/2010 | Hawkins et al. .......... 340/870.07 |
| 2001/0011250 | A1 | 8/2001 | Paltenghe et al. |
| 2002/0002684 | A1 | 1/2002 | Fox et al. |
| 2002/0107972 | A1 | 8/2002 | Keane |
| 2002/0133545 | A1 * | 9/2002 | Fano et al. ..................... 709/203 |
| 2002/0198755 | A1 | 12/2002 | Birkner et al. .................... 705/8 |
| 2003/0055666 | A1 * | 3/2003 | Roddy et al. ..................... 705/1 |
| 2003/0130913 | A1 * | 7/2003 | Ehrman et al. ................. 705/28 |
| 2003/0225707 | A1 * | 12/2003 | Ehrman et al. ................. 705/64 |
| 2004/0133653 | A1 * | 7/2004 | Defosse et al. ............... 709/217 |
| 2004/0205154 | A1 * | 10/2004 | Dalton et al. ................. 709/217 |
| 2006/0036941 | A1 * | 2/2006 | Neil .............................. 715/526 |
| 2006/0161473 | A1 * | 7/2006 | Defosse .......................... 705/13 |
| 2007/0005412 | A1 * | 1/2007 | Martinez et al. .................. 705/8 |
| 2010/0250461 | A1 * | 9/2010 | Arnold et al. ................. 705/333 |

OTHER PUBLICATIONS

Motorola Installs Mobile Data Solution for Basel Ambulance Service, Switzerland: New Mobile Data Software Helping Communication for Basel Ambulance Personnel, PR Newswire, Dec. 15, 2003, online reprint p. 1-2.*

PR Newswire, ClickSoftware to Showcase Joint IBM Asset Moniotring Solution at 'The Future of Utilieis'conference, UK, May 17, 2004, p. 1-4.*

PR Newswire, Tecom Group Announces Contract Award for Handheld Computer System, Apr. 22, 2005, p. 1-3.*

Microsoft.NET Passport Technical Overview, Sep. 2001, entire article.

Microsoft.NET Passport, "What's New", Sep. 2001, entire article.

Webpage entitled: "Free Password Manager—Store passwords—Desktop or Online", availablee at www.passwordsafe.com, 1 page, Oct. 10, 2001.

Secure Your Web Site With Passport, "Implement Passport", *Visual Studio Magazine*, pp. 1-3, Apr. 4, 2002.

Jon Rauschenberger, Secure Your Web Site With Passport, "Simplify Your Web Site Visitors' Experience by Authenticating Them", *Visual Studio Magazine*, pp. 1-3, Apr. 4, 2002.

Secure Your Web Site With Passport, "Sign In, Please", *Visual Studio Magazine*, pp. 1-3, Apr. 4, 2002.

Secure Your Web Site With Passport, "Passport Key to HailStorm's Success", *Visual Studio Magazine*, pp. 1-2, Apr. 4, 2002.

Implementing Mobile Passport, pp. 1-5, Oct. 26, 2001.

Webpage entitled: "Zkey—Corporate", available at www.zkey.com, 1 page, Oct. 10, 2001.

Alan Cohen and Walaika Haskins, "Grab-and-Go Web", *PC Magazine*, Oct. 19, 2000, pp. 1-3.

Webpage entitled: "LinkUall.com—Products—Calendars and Address books", available at www.linkuall.com, pp. 1-2, Oct. 10, 2001.

Webpage entitled: "LinkUall.com—About Us—LinkUall Technology", available at www.linkull.com, 1 page, 2001.

Microsoft PressPass, *Microsoft.Net*: "A Platform for the Next Generation Internet", Jun. 22, 2000, pp. 1-7.

Microsoft Press Release. "Microsoft Passport Offers Streamlined Purchasing Across Leading Web Sites", Oct. 11, 1999, pp. 1-4.

Graeme Bennett, *PC Buyer's Guide.com*, (updated Jun. 22, 2000), "NGWS—Microsoft's Dot Net Strategy", pp. 1-5.

Webpage entitled; "Microsoft's Passport: A single name, password and wallet for the web," available at www.passport.com, pp. 1-2, Aug. 3, 2001.

Webpage entitled: "Microsoft's Passport *Member Services*, What is Passport", available at www.passport.com, pp. 1-12, Aug. 3, 2001.

Webpage entitled: "Microsoft's Passport: Streamlining Commerce and Communication on the Web", available at www.passport.com, Oct. 11, 1999, pp. 1-3.

Webpage entitled: "Online Businesses Use Microsoft Passport Single Sign-In and Wallet Services to Provide Customers with Secure and Convenient Shopping", available at www.microsoft.com, May 17, 2000, pp. 1-2.

Garry Gunnerson, "EZ Login", *PC Magazine*, pp. 102, Mar. 14, 2000.

"Ezlogin.Com Introduces Liveclips, Enabling Net Users to Clip Content from Anywhere on the Web and Paste it on a Custom Page", Java Industry Connection, Mar. 8, 2000, pp. 1-2.

Webpage entitled: "724 Solutions—Products—Wireless Internet Platform", available at www.724.com , pp. 1-3, Sep. 25, 2001.

Webpage entitled: "724 Solutions—Products—m-Commerce", available at www.724.com, pp. 1-4, Sep. 25, 2001.

Webpage entitled: "724 Solutions—Products—Financial Services", available at www.724.com, 1 page, Sep. 25, 2001.

Gator Press Release. "Gator.Com Delivers on the Promise of the Electronic Commerce Modeling Language (ECML) Standard Today: Gator offers one-click shopping at over 5,000 e-commerce sites today", Jun. 14, 1999, pp. 1-2, Aug. 20, 2001.

Gator Press Release, "Internet Start-up Gator.com Introduces Gator, the Web's First Smart Online Companion: New Internet product offers one-click login and express registration and checkout across the web", Jun. 14, 1999, pp. 1-3, Aug. 20, 2001.

Gator Press Release. "Gator Helps Consumers at More than 25,000 E-Commerce and Registration Sites in First Month of Usage: Software an invaluable companion for more than 80,000 online consumers", Aug. 3, 1999, pp. 1-2, Aug. 20, 2001.

Webpage entitled: "Affiliate Application" *How do Gator, Price Helper, and OfferCompanion Work?*, available at www.gator.com, 1 page, Sep. 6, 2001.

Webpage entitled: "Yodlee: e-Personalization Solutions", available at www.yodlee.com, pp. 1-2, Sep. 6, 2001.

Webpage entitled: "Yodlee: e-Personalization Platform", available at www.yodlee.com, 1 page, Sep. 6, 2001.

Webpage entitled: "Yodlee: e-Personalization Applications", available at www.yodlee.com, 1 page, Sep. 6, 2001.

Webpage entitled: "Yodlee for Web: One-Click Access to All Personal Accounts", available at www.yodlee,com, 1 page, Sep. 6, 2001.

Webpage entitled: "Yodlee for Mobile: Simplify Your Life on the Road with Yodlee2Go", available at www.yodlee.com, 1 page, Sep. 6, 2001.

Webpage entitled: "Yodlee2Go: Palm OS Wireless", available at www.yodlee.com, 1 page, Sep. 6, 2001.

Webpage entitled: "Yodlee2Go: Web-enabled Phones", available at www.yodlee.com, 1 page, Sep. 6, 2001.

Webpage entitled: "Security Overview", available at www.yodlee.com, pp. 1-2, Sep. 6, 2001.

Webpage entitled: "Co-Brand Partner Opportunities", available at www.yodlee.com, pp. 1-2, Sep. 6, 2001.

Webpage entitled: "Content Partner Opportunities", available at www.yodlee.com, 1 page, Sep. 6, 2001.

Webpage entitled: "Sweet Enonymity", available at www.enonymous.com, pp. 1-2, Sep. 6, 2001.

Webpage entitled: "Vision for an Enonymous Infomediary", available at www.enonymous.com, pp. 1-3, Sep. 6, 2001.

Webpage entitled: "Learn More", available at www.digitalme.com, pp. 1-2, Sep. 6, 2001.

Webpage entitled: "Take Control", available at www.digtalme.com, pp. 1-2, Sep. 6, 2001.

Webpage entitled: "Make it Convenient", available at www.digitalme.com, pp. 1-3, Sep. 6, 2001.

Webpage entitled: "Create Relationships", available www.digitalme.com, pp. 1-2, Sep. 6, 2001.

Webpage entitled: "FAQ", available at www.digitalme.com, pp. 1-2, Sep. 6, 2001.

Webpage entitled; "Digitalme™ Fact Sheet (www.digitalme.com)", available at www.digitalme.com, pp. 1-3, Sep. 6, 2001.

"Choicepoint Unveils New Web-based Pre-employment Screening Service", BusinessWire p. 1287, May 17, 1999.

* cited by examiner

Confirm manufacturer before service (see Vendor # in the blue section of the screen below). If incorrect, exit sheet and try again.
1. Delfield
2. Hobart
3. Hoshizaki
4. Other Take photo of refrigerator - panoramic shot showing box and surrounding area (not a close-up shot)

Apply asset number decal to refrigerator. Record the asset number now.

_____

Take photo of Asset Decal.

Record interior box temperature using reading from test "puck".

_____

Enter Brand of walk-in Box

_____

Enter Serial Number

_____

Walk-in Refrigeration Type
1. Refrigerator ONLY
2. Freezer ONLY

Box in use?
1. In use
2. Inoperative, but needed
3. Inoperative, Junk, Used for dry storage Walk-in Door Closure Condition (Does it close unassisted?)
Yes    No Walk-in Door Gasket Condition (Need Replacement?)
Yes    No Walk-in Door Sweep / Threshold gasket needs replacement?
Yes    No Walk-in Door Alignment (Is door mis-aligned, racked, bent hinges?)
Yes    No Walk-in Door and/or door interior liner ( Is door bent, split, cracked or has holes in liner?)
Yes    No Walk-in Evaporator coil / Fan blade(s), Fan motor(s) condition / operation.
1. Not Visible
2. Ice visible or at least 1 fan not running
3. Fan (s) running, coil and fan (s) clean
4. Fan (s) running, dirty coil and fan (s)

Built-in Thermometer
1. Not Present
2. Present and working
3. Present and inoperative Interior (hanging) thermometer
1. Not Present
2. Present and working
3. Present and inoperative Any known or suspected refrigerant system repairs? (compressor replacement, adding refrigerant)
Yes    No Estimate the number of trips a service agent needs to repair this box.
1. 0 - Operator repairs
2. 1
3. 2

Do you have any comments about this box?
Yes    No

If Yes, Type comments here: _____

Fig. 9

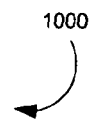

Q. Take picture of the installed coffee machine (wide angle, not close up)
A.

Q. Take picture of water and electrical connection
A.

Q. How many urns were installed?
A. 0
A. 1
A. 2
A. 3
A. 4
A. 5

Q. Enter coffee brewer serial number
A.

Q. Electrical sub-panel needed?
A. No
A. Yes

Q. Installation complete and working?
A. No
A. Yes

Q. Does the store have a dish washer?
A. No
A. Yes - Commercial Dish Washing Machine Q. Take picture of the dish washer
       A.

A. Yes - Power Wash Sink

Q. Take picture of the dish washer
       A.

Fig. 10

| Grouping 1211 | WorkSheet 1212 | Box Type 1213 | Model 1214 | Asset No. 1215 | Length 1216 | Estimated Repair Cost 1207 | Repairs 1217 | Quantity/Description 1218 | Report Number 1219 |
|---|---|---|---|---|---|---|---|---|---|
| detail | Upright ID and Condition | Upright - Hobart | qfl/q; | 11593 | 54 | $1 | Manufacturer | Hobart | 2g.4ji.4wo.11mb6qlc |
| detail | Upright ID and Condition | Upright - Hobart | qfl/q; | 11593 | 54 | $1 | Sections | 2 | 2g.4ji.4wo.11mb6qlc |
| detail | Upright ID and Condition | Upright - Hobart | qfl/q; | 11593 | 54 | $1 | Door Configuration | Full Height | 2g.4ji.4wo.11mb6qlc |
| detail | Upright ID and Condition | Upright - Hobart | qfl/q; | 11593 | 54 | $10 | Door Handle Type | Spear type (Hobart) | 2g.4ji.4wo.11mb6qlc |
| detail | Upright ID and Condition | Upright - Hobart | qfl/q; | 11593 | 54 | $1 | Refrigeration Type | Combination Ref/Frz | 2g.4ji.4wo.11mb6qlc |
| detail | Upright ID and Condition | Upright - Hobart | qfl/q; | 11593 | 54 | $1 | Box in use? | In use | 2g.4ji.4wo.11mb6qlc |
| detail | Upright ID and Condition | Upright - Hobart | qfl/q; | 11593 | 54 | $1 | Doors Not Closing Unassisted | 0 | 2g.4ji.4wo.11mb6qlc |
| detail | Upright ID and Condition | Upright - Hobart | qfl/q; | 11593 | 54 | $91 | Defective Gaskets | 1 | 2g.4ji.4wo.11mb6qlc |
| detail | Upright ID and Condition | Upright - Hobart | qfl/q; | 11593 | 54 | $0 | Defective Doors | 0 | 2g.4ji.4wo.11mb6qlc |
| detail | Upright ID and Condition | Upright - Hobart | qfl/q; | 11593 | 54 | $214 | Doors with Damaged Hinges | 1 | 2g.4ji.4wo.11mb6qlc |
| detail | Upright ID and Condition | Upright - Hobart | qfl/q; | 11593 | 54 | $0 | Damaged Interior Liner | No | 2g.4ji.4wo.11mb6qlc |
| detail | Upright ID and Condition | Upright - Hobart | qfl/q; | 11593 | 54 | $0 | Door Sections with Broken Shelf Pegs | 0 | 2g.4ji.4wo.11mb6qlc |
| detail | Upright ID and Condition | Upright - Hobart | qfl/q; | 11593 | 54 | $0 | Evaporator Coil/Fan Condition | Not Visible | 2g.4ji.4wo.11mb6qlc |
| detail | Upright ID and Condition | Upright - Hobart | qfl/q; | 11593 | 54 | $120 | Condenser Coil | Good condition and Dirty | 2g.4ji.4wo.11mb6qlc |
| detail | Upright ID and Condition | Upright - Hobart | qfl/q; | 11593 | 54 | $120 | Condenser Fan Blade | Dirty | 2g.4ji.4wo.11mb6qlc |
| detail | Upright ID and Condition | Upright - Hobart | qfl/q; | 11593 | 54 | $0 | Condenser Fan Shroud | Present | 2g.4ji.4wo.11mb6qlc |
| detail | Upright ID and Condition | Upright - Hobart | qfl/q; | 11593 | 54 | $1 | Condenser Compartment Cover | Present | 2g.4ji.4wo.11mb6qlc |
| detail | Upright ID and Condition | Upright - Hobart | qfl/q; | 11593 | 54 | $1 | Filter Media in Use? | No | 2g.4ji.4wo.11mb6qlc |
| detail | Upright ID and Condition | Upright - Hobart | qfl/q; | 11593 | 54 | $0 | Built-in Thermometer | Present and working | 2g.4ji.4wo.11mb6qlc |
| detail | Upright ID and Condition | Upright - Hobart | qfl/q; | 11593 | 54 | $0 | Hanging Thermometer | Not Present | 2g.4ji.4wo.11mb6qlc |
| detail | Upright ID and Condition | Upright - Hobart | qfl/q; | 11593 | 54 | $10 | Refrigerant System Problems | Yes | 2g.4ji.4wo.11mb6qlc |
| detail | Upright ID and Condition | Upright - Hobart | qfl/q; | 11593 | 54 | $10 | Comments | Yes | 2g.4ji.4wo.11mb6qlc |
| sheet summary | Upright ID and Condition | Upright - Hobart | qfl/q; | 11593 | 54 | $583 | | | 2g.4ji.4wo.11mb6qlc |

Fig. 12

SYSTEM AND METHOD FOR MANAGING ASSET INSTALLATION AND EVALUATION

RELATED PATENT APPLICATIONS

This patent application is a continuation of U.S. patent application Ser. No. 11/323,562, entitled "SYSTEM AND METHOD FOR MANAGING ASSET INSTALLATION AND EVALUATION," filed Dec. 30, 2005 now U.S. Pat. No. 7,957,990. The complete disclosure of the above-identified related application is hereby fully incorporated herein by reference.

FIELD OF THE INVENTION

The invention relates generally to managing asset installation and evaluation. More particularly, the invention relates to efficient and effective centralized management of automated field force installation and evaluation of assets.

BACKGROUND OF THE INVENTION

Assets are valuable items that can be movable or fixed. Distributed assets are assets that are geographically dispersed. Typically, companies own and/or maintain multiple distributed and non-distributed assets that they purchase or lease (or both) from one or more asset vendors. Successful management of such assets, including efficient and effective asset installation and evaluation, can help companies maximize asset value and reduce costs. As used herein, the term "asset installation" means placing an asset in a designated place or condition and/or preparing the asset for use. The term "asset evaluation" is used herein to mean evaluating the placement, operation, or condition of an asset to determine the value of the asset.

Service representatives typically are responsible for asset installation and evaluation. Each service representative can be employed, e.g., by the asset holder, the asset vendor, or a third party person or entity, such as a service representative agency. For simplicity, each service representative's employer, whether an asset holder, asset vendor, or another person or entity, is referred to herein as a "service representative agency." The term "asset holder" is used herein to refer to a person or entity that operates, owns, leases, or possesses an asset. Depending on the size of a company, the types and amounts of the company's assets, the geographic displacement among the company's assets, and the particular type of work to be performed on or with the company's assets, the company may require assistance from multiple service representatives. For example, a company comprising multiple types of assets, such as various types of food service equipment, that are geographically dispersed throughout the United States may require several service representatives to install and/or evaluate the condition of the assets.

Each service representative usually must be trained to uniformly handle the particular types of assets and installation and evaluation procedures to which they are assigned. Traditionally, such training has involved reading lengthy training manuals, attending intensive seminars, taking proficiency examinations, and/or serving as a pseudo apprentice under an experienced service representative. The resources spent, in both time and money, to train service representatives can be significant—often prohibitively so.

Once in the field, service representatives generally are unsupervised. The asset holders, asset vendors, and/or service representative agencies expect the service representatives to uniformly complete their work assignments in accordance with their training. Traditionally, however, neither the asset holders, asset vendors, nor the service representative agencies have been able to conveniently or effectively monitor the service representatives' performance, e.g., to monitor progress or ensure uniformity of service levels and methodologies.

A conventional approach to monitoring service representatives' performance is to require the service representatives to complete written reports or checklists upon completion of a work assignment. The reports/checklists are mailed or hand-delivered to the service representative agencies, which analyze the reports/checklists and generate additional reports based on the information contained therein. Because the reports/checklists are not delivered until after the work assignment, sometimes days or weeks after the work assignment, the service representative agencies' reports can sometimes be incomplete and untimely.

In view of the foregoing, a need exists in the art for a system and method of managing asset installation and evaluation, whereby service representatives can efficiently and uniformly complete their work assignments. In addition, a need exists in the art for such a system and method to enable asset holders, asset vendors, and/or service representative agencies to timely monitor the service representatives' work performance.

SUMMARY OF THE INVENTION

The invention satisfies the above-described and other needs by providing systems and methods for efficiently and effectively managing asset installation and asset evaluation. Specifically, the invention allows asset holders, asset vendors, and/or service representative agencies to centrally manage automated field force asset installation and asset evaluation in real-time or near real-time. The asset holders, asset vendors, and/or service representative agencies can instantly (or nearly instantly), uniformly implement service methodologies and timely monitor service representative performance and service results.

In one aspect of the invention, the asset holders, asset vendors, and/or service representative agencies can provide each service representative with a wireless, handheld device operable to display one or more uniform sequences of instructions and prompts ("worksheets") related to an asset installation and/or an asset evaluation. That is, each wireless handheld device can display the same or uniform set of worksheets because of the central management of the wireless handheld devices. The displayed worksheets can help each service representative to perform the asset installation/evaluation. While performing the asset installation/evaluation at an asset location, each service representative can follow the instructions, and/or respond to the prompts, displayed on the handheld device.

The service representatives can enter responses to the prompts into their handheld devices. The handheld devices can transmit the responses via a wireless network or other suitable data communication means, to a server operable to store the responses in a data storage medium. By transmitting the responses via a wireless network, for example, the asset holders, asset vendors, and/or service representative agencies can review the service representatives' responses, and thus track asset installations/evaluations and monitor service representative performance in real-time or near real-time. The transmission of responses can be sent immediately or they can be sent in batches after a predetermined amount of time or when the handheld device has a good connection to the network.

A network device operated, e.g., by an asset holder, an asset vendor, and/or a service representative agency can access a reporting module of the server, e.g., via a network, to query the data stored in the data storage medium and to generate one or more reports based on the data. The asset holder, asset vendor, and/or service representative agency can utilize the reports to monitor the service representatives' performance in real-time or near real-time. For example, the service representative agency can generate a report to determine the status of certain asset installations. The service representative agency can also generate a report to determine the results of certain asset evaluations.

By knowing the exact status of each work assignment, the asset holder, asset vendor, and/or service representative agency, can efficiently manage service representatives. For example, the service representative agency can readily deploy a substitute service representative to continue an asset installation/evaluation where the previous service representative left off. In addition, by tracking, in real-time (or near real-time), the status of asset installations and/or the results of asset evaluations, asset holders can maintain accurate budgets and accounting documents based on exact asset values, asset replacement costs, and/or asset installation/evaluation costs.

In another aspect of the invention, the network device can access a worksheet management software module of the server to create customized worksheets. The worksheet management software can transmit the worksheets to one or more of the handheld devices, e.g., upon creation of the worksheets or at other designated times. For example, the worksheet management software can transmit the worksheets to the handheld devices via a wireless network, providing the service representatives with the worksheets in real-time or near real-time. Each asset holder, asset vendor, and/or service representative agency can designate to which service representatives and/or handheld devices the worksheets are transmitted. For example, if a service representative agency desires to provide each of its service representatives with the same sequences of asset installation/evaluation instructions and prompts, the service representative agency can instruct the worksheet management software module to transmit the same worksheets to each of the service representatives. By providing each service representative with the same worksheets, the service representative agency can help to ensure uniformity of service levels and methodologies.

In yet another aspect of the invention, the handheld device can comprise a printer operable to print an asset tag that identifies a particular asset. For example, the asset tag can comprise a barcode or other unique identifier that identifies a particular asset being installed or evaluated by a service representative. During a work assignment, the service representative can print the asset tag and affix it to the asset. The handheld device can further comprise a barcode scanner device operable to scan a barcode, e.g., from an asset tag. In addition, the handheld device can comprise a digital camera device operable to record a digital image of the asset and/or the asset tag.

Additional aspects, features, and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

FIG. 9 is an illustration of a worksheet related to an asset evaluation, generated in accordance with an exemplary embodiment of the invention.

FIG. 10 is an illustration of a worksheet related to asset installation and asset evaluation, generated in accordance with an exemplary embodiment of the invention.

FIG. 12 is an illustration of a report related to an asset evaluation, generated in accordance with an exemplary embodiment of the invention.

FIG. 13-1 thru FIG. 13-3, illustrates exemplary screen displays which provide a demonstration of the functionality of the handheld device in accordance with an exemplary embodiment of the invention.

DETAILED DESCRIPTION OF EXEMPLARY EMBODIMENTS

The invention is directed to systems and methods for managing asset installation and evaluation. Efficient and effective management of asset installation and evaluation can help companies maximize asset value and reduce costs. It can also help companies ensure uniformity in asset installation and asset evaluation service levels and service methodologies.

In accordance with an exemplary embodiment of the invention, service representatives can each perform an asset installation and/or an asset evaluation with the aid of a handheld device. In several preferred embodiments, the handheld device is "wireless," meaning that it can communicate with a computer network through RF, infrared, acoustic, or through other non-wired communication mediums. Wireless handheld devices can increase the mobility of a service representative. The handheld device can display worksheets comprising a sequence of instructions and prompts related to the asset installation/evaluation to the service representative. In performing the asset installation/evaluation, the service representative can follow the instructions and enter responses to the prompts into the handheld device. The handheld device can communicate with a server, e.g., via a network, to download the worksheets onto the handheld device and to upload from the handheld device data, e.g., the responses, related to the installation/evaluation. Authorized users' network devices can interact with a reporting module of the server to generate reports based on the uploaded data. The reports can provide the authorized users with real-time or near real-time information about the service representatives' performance and about particular assets, including, e.g., information about particular asset installations/evaluations.

Turning now to the drawings, in which like numerals indicate like elements throughout the several figures, exemplary embodiments of the invention are described in detail.

Figure 1:
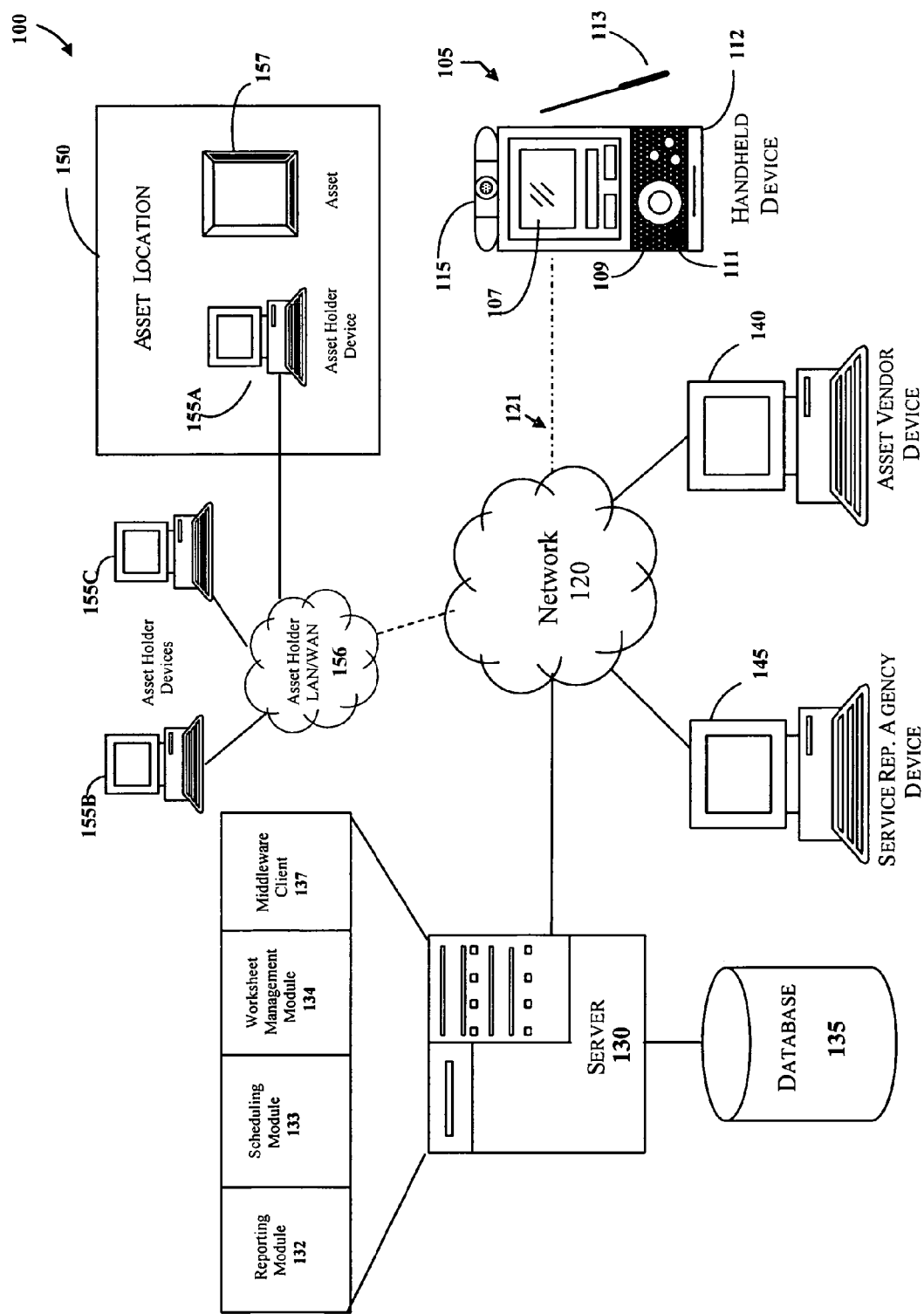
FIG. 1 is a block diagram illustrating an exemplary operating environment for implementation of various exemplary embodiments of the invention.

FIG. 1 is a block diagram illustrating an exemplary operating environment 100 for implementation of various embodiments of the invention. Network devices are interconnected via a network 120. The network 120 can comprise a wired or wireless telecommunication means by which network devices can exchange data, including for example, a local area network ("LAN"), a wide area network ("WAN"), an intranet, an Internet, or any combination thereof. Throughout the discussion of exemplary embodiments of the invention, it should be understood that the terms "data" and "information" are used interchangeably herein to refer to text, images, audio, video, signatures, and/or any other form of information that can exist in a computer-based environment.

A network device can be any device capable of transmitting and receiving data over the network 120. For example, a network device can be a server 130, a service representative agency device 145, an asset vendor device 140, a handheld device 105, a dedicated storage device, such as a database 135, and/or an asset holder device 155. The server 130 can comprise software for interacting, e.g., via the network 120 and/or a direct data link (not shown), with the database 135 and other network devices. As one example, each of the service representative agency device 145, the asset vendor device 140, and the asset holder device 155 can interact with the server 130 via the network 120 using web browser application software. A reporting module 132 of the server 130 can mange the storage, retrieval, and organization of data in the database 135. A middleware client 137 of the server 130 can manage communications between the server 130, the database 135, and the handheld device 105 during an exemplary synchronization of data between the handheld device 105 and the database 135. Multiple asset holder devices 155A-C can be interconnected via a LAN or a WAN, referred to herein as an "asset holder LAN/WAN" 156.

Each service representative agency device 145, asset vendor device 140, and asset holder device 155 can comprise a desktop computer, a laptop computer, a handheld device 105, or any other wired or wireless, processor-driven device. By way of illustration only, the handheld device 105 can be a Microsoft Windows® CE-based device, such as the Casio 'Cassiopeia,' the Dell™ 'Axim™,' etc., a Palm OS-based personal digital assistant (PDA), or any other suitable handheld computing device. The handheld device 105 can comprise input/output ("I/O") devices, such as a display screen 107, integrated controls (buttons) 109, a camera 115, a scanner (not shown), a microphone 111, a speaker (not shown), and a printer 112. The handheld device 105 can be configured with any combination of integrated I/O devices or add-on I/O devices. Add-on I/O devices can be coupled to the handheld device 105, e.g., by way of an expansion slot, port, wireless link, or other suitable interface. The display screen 107 can be touch-sensitive or motion-sensitive to accept input signals from a pointing device 113, such as a stylus or finger.

The handheld device 105 can further comprise communication capabilities in any well-known or emerging form, including, e.g., a modem, a network interface, or the like. Through such capabilities, the handheld device 105 can communicate with the network 120 via a wireless connection 121 and/or via a wired connection. By communicating via a wireless connection 121, for example, the handheld device 105 can transmit data to, and receive data from, the server 130 in real-time or near real-time. Thus, the service representative agencies, asset holders, and/or asset vendors can track asset installations and evaluations and monitor service representatives' performance in real-time or near real-time. In addition, the service representatives can continually receive updated worksheets and other information that can assist them in performing their work assignments. In one embodiment of the invention, the handheld device 105 can communicate with the network 120 via another network device, for example, if connected to the other network device by way of a cradle, cable, or other device or wireless connection. The handheld device 105 can be configured to communicate according to any suitable communication protocol(s).

A worksheet management module 134 of the server 130 can generate worksheets comprising a sequence of instructions and prompts related to an asset installation and/or an asset evaluation and download the worksheets to one or more of the handheld devices 105. The instructions and prompts can aid a service representative in installing and/or evaluating an asset 157 at an asset location 150. Described below, in conjunction with FIGS. 9 and 10, are exemplary worksheets.

The asset location 150 is a site in which one or more assets 157 are located. For example, the asset location 150 can comprise an office building, retail store, restaurant, factory, warehouse, gymnasium, airport, or any other suitable structure or location. Each asset location 150 can be operated, owned, and/or possessed, for example, by an asset holder, an agent of the asset holder, or another suitable person or entity.

In one embodiment of the invention, authorized network devices, e.g., the service representative agency device 145, the asset vendor device 140, and/or the asset holder devices 155 can interact with the worksheet management module 134 to generate customized worksheets. The authorized network devices can also interact with the worksheet management module 134 to designate to which handheld devices 105 to download the worksheets. By creating customized worksheets and designating the handheld devices 105 to which the customized worksheets are downloaded, authorized users, e.g., service representative agencies, asset vendors, and/or asset holders, can more readily regulate the service representatives' service levels and service methodologies, and the uniformity thereof.

The worksheet management module 134 can download the worksheets to the handheld devices 105 upon generation of the worksheets or at other designated times. In one embodiment of the invention, a scheduling module 133 of the server 130 can instruct the worksheet management module 134 to download the worksheets at the designated times. In a further embodiment of the invention, authorized users can interact with the scheduling module 133, e.g., via the network 120, to designate the times at which they desire each worksheet to be downloaded.

While installing and/or evaluating an asset 157 at an asset location 150, a service representative can collect data related to the asset 157 and/or the installation/evaluation on the service representative's handheld device 105. For example, the data can comprise responses to the worksheet prompts displayed on the handheld device 105. The handheld device 105 can transmit the collected data to the server 130, e.g., for storage in the database 135. The database 135 can be configured to store the data in an encrypted format, using a relational data storage model, an object oriented data storage model, a data aggregate storage model (e.g., one or more XML aggregates or any other suitable data storage model). Other methods for securing the data stored in the database 135, including without limitation, password protection, will be apparent to those of ordinary skill in the art.

Via the network 120, authorized network devices can instantly (or nearly instantly) access the data in the database 135. In one embodiment of the invention, the reporting module 132 of the server 130 can be configured to query the data and to create reports based on the data. In a further embodiment of the invention, authorized users can access the reporting module 132 to create customized reports. The authorized users can access the reporting module 132 either at the server 130 or, via the network 120, at other network devices, such as the service representative agency device 145, the asset vendor device 140, or the asset holder devices 155. In yet another embodiment of the invention, the authorized users can access the reporting module 132 at the server 130 via a web-interface or other suitable interface.

The scheduling module 133 can be configured to instruct the reporting module 132 to generate each report at a designated time. For example, the scheduling module 133 can automatically instruct the reporting module 132 to generate a report immediately upon receipt of data from a handheld device 105. The report recipient(s), e.g., the asset holder, asset vendor, and/or service representative agency, can utilize the report(s) to timely monitor the service representatives' performance. They can also utilize the report(s) to timely monitor the results of the service representatives' work. For example, the service representative agency can generate a report to determine the status of certain asset installations, and the asset holder can generate a report to determine the results of certain asset evaluations.

Figure 2:
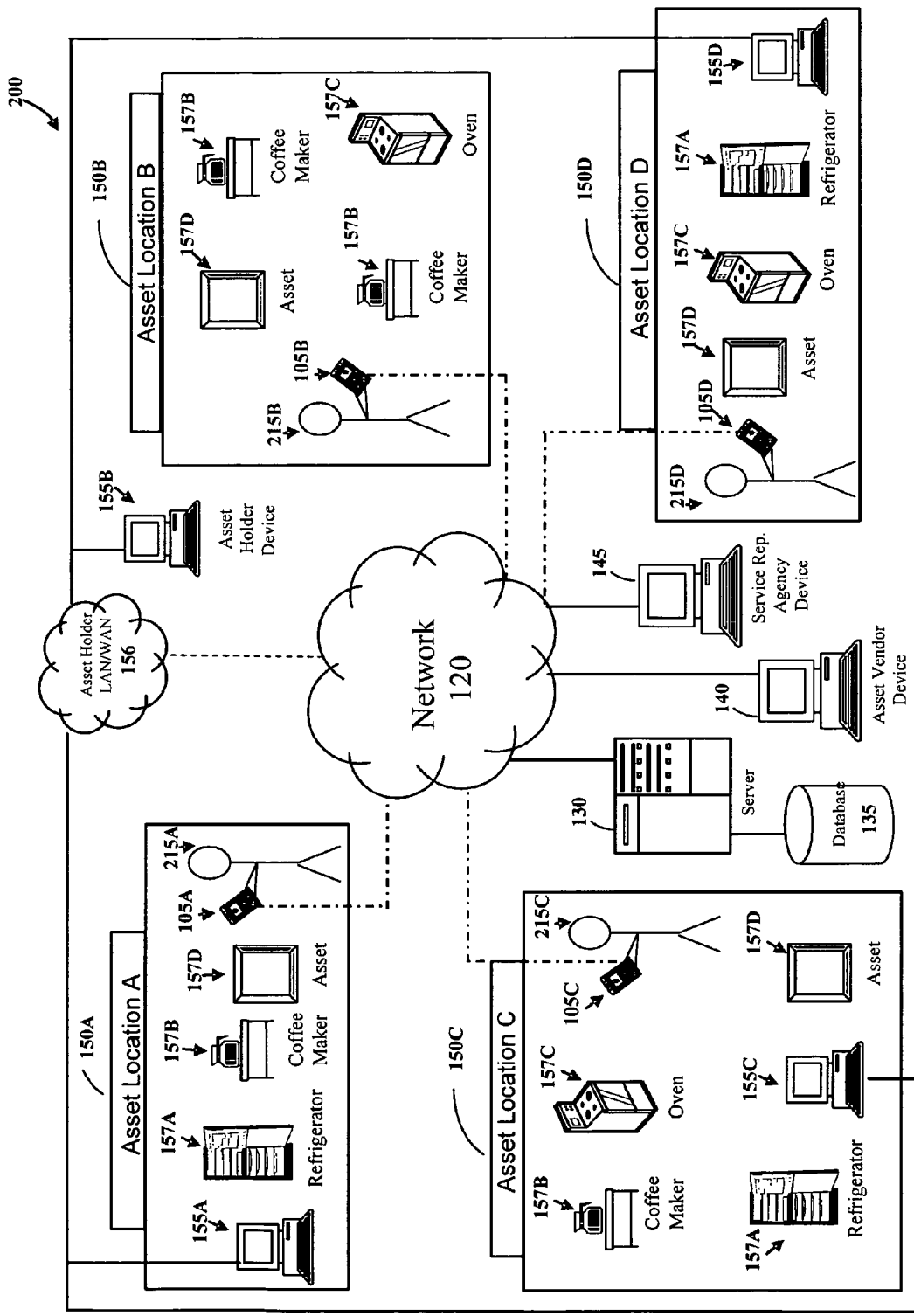
FIG. 2 is a block diagram providing a detailed illustration of different types of assets that can be managed according to one exemplary embodiment of the invention.

FIG. 2 is a block diagram providing a detailed illustration of an exemplary operating environment 200 for implementation of various embodiments of the invention. As in FIG. 1, network devices, including a server 130, an asset vendor device 140, a service representative agency device 145, handheld devices 105A-D, and asset holder devices 155A-D, are interconnected via a network 120. The asset holder devices 155A-D are further interconnected via an asset holder LAN/WAN 156.

With the assistance of their handheld devices 105A-D, service representatives 215A-D can perform asset installations and/or asset evaluations at multiple asset locations 150A-D. Each asset location 150A-D comprises one or more assets 157A-E. The types and amounts of assets 157A-E can vary from asset location 150A-D to asset location 150A-D. For example, asset location 150A comprises a refrigerator 157A, a coffee maker 157B, and another asset 157D, and asset location 150B comprises two coffee makers 157B, an oven 157C, and another asset 157D.

Using their network devices, authorized users, such as asset holders, asset vendors, and/or service representatives, can centrally manage the service representatives 215A-D. The authorized users' network devices can interact with the server 130 via the network 120 to periodically transmit updated, modified, or new worksheets comprising a sequence of instructions and prompts related to the service representatives' 215A-D work assignments. While performing the work assignments, the service representatives 215A-D can collect data related to the assets 157A-D and/or the installations/evaluations on their handheld devices 105A-D. For example, the data can comprise responses to the worksheet prompts displayed on the handheld devices 105A-D. The handheld devices 105A-D can transmit the collected data to the server 130, e.g., for storage in the database 135.

Via the network 120, the authorized users' network devices can interact with the server 130 to generate reports based on the data. Such reports can help the authorized users to monitor the service representatives' 215A-D performance, e.g., to ensure uniformity of service levels and service methodologies. The reports can also help the authorized users to monitor the results of the service representatives' 215A-D work, e.g., to determine the results of certain asset evaluations and to determine the status of certain asset installations/evaluations.

Figure 3:
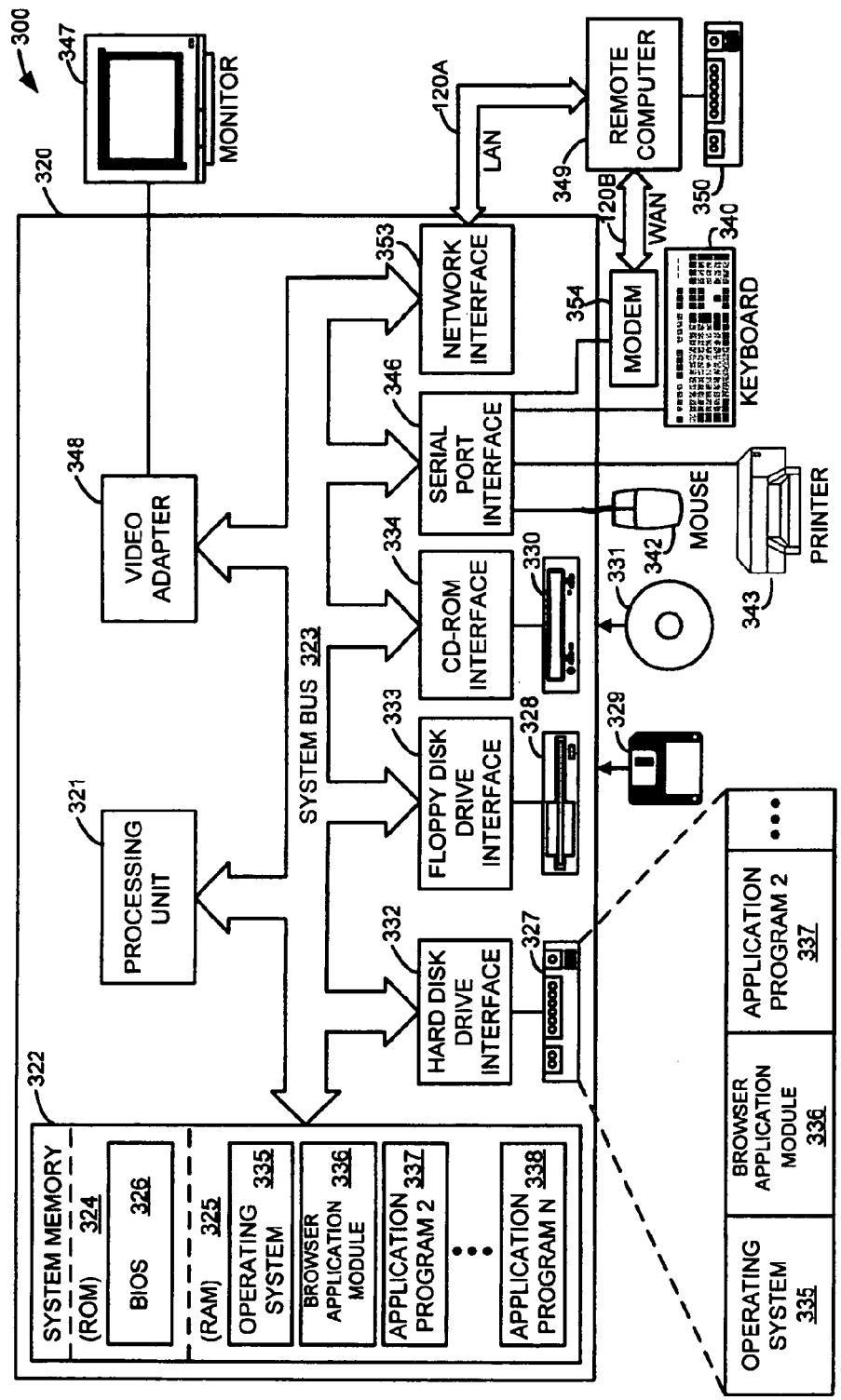
FIG. 3 is a block diagram illustrating a general component architecture for a network device constructed in accordance with an exemplary embodiment of the invention.

FIG. 3 is a block diagram illustrating a general component architecture for a network device 300 constructed in accordance with an exemplary embodiment of the invention. The exemplary network device 300 comprises a general-purpose computing device in the form of a conventional personal computer 320. Generally, the personal computer 320 comprises a processing unit 321, a system memory 322, and a system bus 323 that couples various system components, including the system memory 322, to the processing unit 321. The system bus 323 can comprise any of several types of bus structures, including a memory bus or memory controller, a peripheral bus, or a local bus, using any of a variety of bus architectures. The system memory 322 comprises a read-only memory (ROM) 324 and a random access memory (RAM) 325. A basic input/output system (BIOS) 326 containing the basic routines that help to transfer information between elements within the personal computer 320, such as during start-up, is stored in the ROM 324.

The personal computer 320 further comprises a hard disk drive 327 for reading from and writing to a hard disk (not shown), a magnetic disk drive 328 for reading from or writing to a removable magnetic disk 329 such as a floppy disk, and an optical disk drive 330 for reading from or writing to a removable optical disk 331 such as a CD-ROM or other optical media. The hard disk drive 327, magnetic disk drive 328, and optical disk drive 330 are connected to the system bus 323 by a hard disk drive interface 332, a magnetic disk drive interface 333, and an optical disk drive interface 334, respectively. Although the exemplary network device 300 employs a ROM 324, a RAM 325, a hard disk drive 327, a removable magnetic disk 329, and a removable optical disk 331, it should be appreciated by those skilled in the art that other types of computer readable media which can store data that is accessible by a computer can also be used in the exemplary network device 300, such as magnetic cassettes, flash memory cards, digital video disks, Bernoulli cartridges, and the like. The drives and their associated computer readable media can provide nonvolatile storage of computer-executable instructions, data structures, program modules, and other data for the personal computer 320.

A number of modules can be stored on the ROM 324, RAM 325, hard disk drive 327, magnetic disk 329, or optical disk 331, including an operating system 335 and various application modules 336-338. Application modules 336-338 can include routines, sub-routines, programs, objects, components, data structures, etc., which perform particular tasks or implement particular abstract data types.

A user can enter commands and information to the personal computer 320 through input devices, such as a keyboard 340 and a pointing device 342. The pointing device 342 can comprise a mouse, a trackball, or an electronic pen that can be used in conjunction with an electronic tablet. Other input devices (not shown) can comprise a microphone, joystick, game pad, satellite dish, scanner, or the like. These and other input devices are often connected to the processing unit 322 through a serial port interface 346 that is coupled to the system bus 323, but can be connected by other interfaces, such as a parallel port, game port, a universal serial bus (USB), or the like. A display device 347, such as a monitor, can also be connected to system bus 323 via an interface, such as a video adapter 348. In addition to the display device 347, the personal computer 320 can include other peripheral output devices, such as speakers (not shown) and a printer 343.

The personal computer 320 can operate in a networked environment using logical connections to one or more remote computers 349. The remote computer 349 can be another personal computer, a server, a client, a router, a network PC, a peer device, or other common network node. While the remote computer 349 typically includes many or all of the elements described above relative to the personal computer 320, only a memory storage device 350 has been illustrated in FIG. 2 for simplicity. The logical connections depicted in FIG. 2 include a LAN 120A and a WAN 120B. Such networking environments are commonplace in offices, enterprise-wide computer networks, intranets, and the Internet.

When used in a LAN networking environment, the personal computer 320 is often connected to the LAN 120A through a network interface or adapter 353. When used in a WAN networking environment, the personal computer 320 typically comprises a modem 354 or other means for establishing communications over the WAN 120B, such as the Internet. The modem 354, which can be internal or external, is connected to system bus 323 via a serial port interface 346. In a networked environment, program modules depicted relative to personal computer 320, or portions thereof, can be stored in the remote memory storage device 350. It will be appreciated that the network connections shown are exemplary and other means of establishing a communications link between the computers can be used.

Moreover, those skilled in the art will appreciate that the network device 300 illustrated in FIG. 3 can comprise other suitable computer system configurations.

Figure 4:
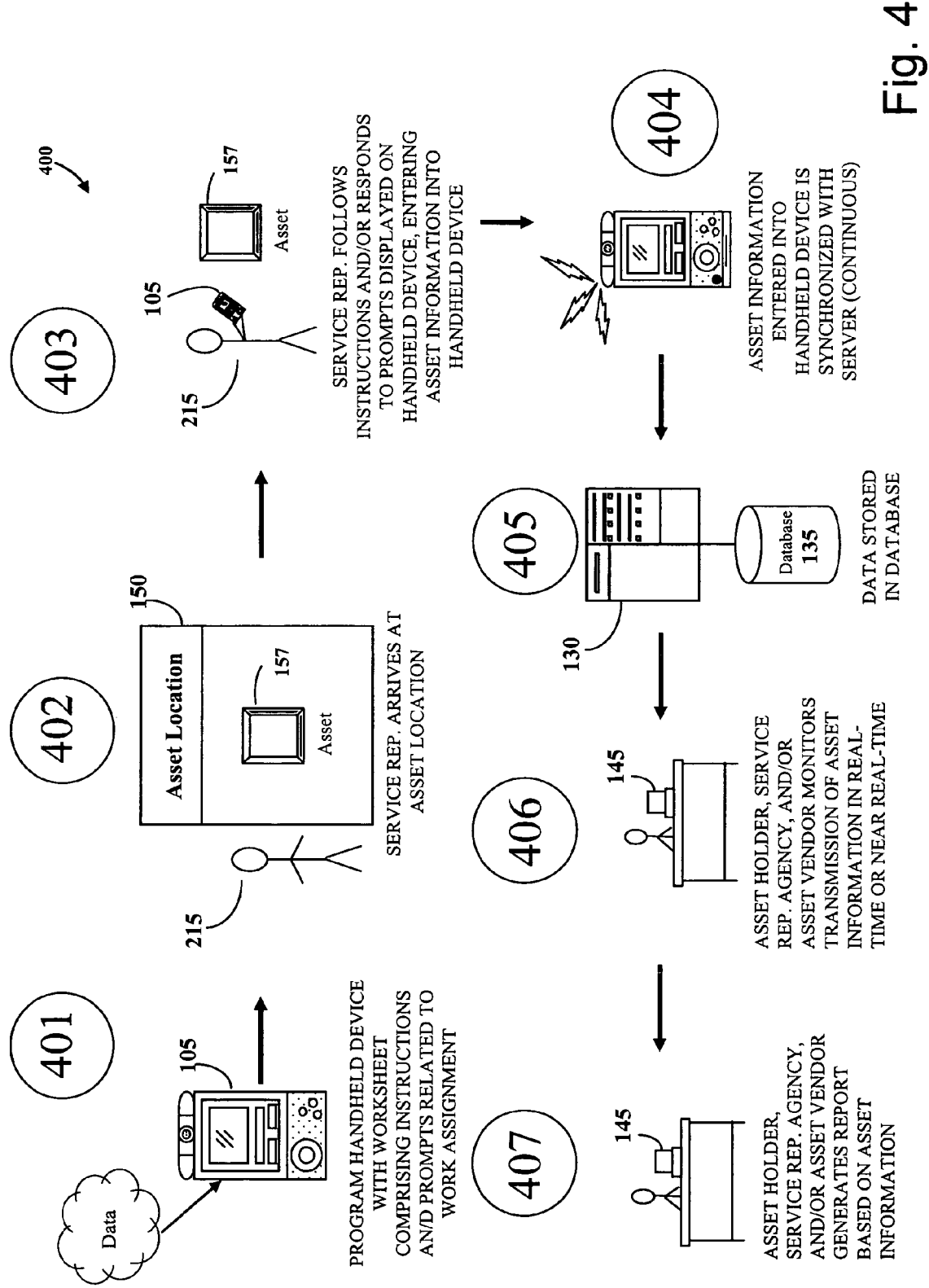
FIG. 4 is a flow diagram illustrating steps in a method for managing asset installation and evaluation, according to an exemplary embodiment of the invention.

FIG. 4 is a flow diagram illustrating steps in a method 400 for managing asset installation and evaluation, according to an exemplary embodiment of the invention. The exemplary method 400 is merely illustrative and, in alternative embodiments of the invention, certain steps can be performed in a different order, in parallel with one another, certain steps can be omitted entirely, and/or certain additional steps can be performed.

In step 401, a handheld device 105 is programmed with at least one worksheet comprising a sequence of instructions and prompts related to an asset installation and/or an asset evaluation. Step 401 is described in greater detail below, in conjunction with FIG. 5. In step 402, a service representative 215 arrives at an asset location 150 to perform the installation, and/or evaluation, of the asset 157. In step 403, the service representative 215 follows the instructions and/or responds to the prompts displayed on the handheld device 105 to perform the asset installation/evaluation. In so doing, the service representative 215 collects data related to the asset 157 and/or to the asset installation/evaluation, "asset information," on his handheld device 105.

In step 404, the asset information entered into the handheld device 105 in step 403 is synchronized with the server 130. Either the server 130 or the handheld device 105 can initiate the synchronization. In synchronizing the handheld device 105 with the server 130, the handheld device 105 transmits the data collected by the service representative 215 to the server 130. Synchronization of the handheld device 105 can also involve transmitting data, e.g., updated worksheets, instructions, software, and/or messages, from the server 130 to the handheld device. Step 404 is described in greater detail below, in conjunction with FIG. 6.

Those skilled in the art will appreciate that any file synchronization protocol can be used to synchronize the handheld device 105 with the server 130. For example, a common file synchronization protocol suitable for the invention is the Merge Replication protocol developed by Microsoft Corporation. Merge Replication is a protocol for distributing data from a publisher (e.g., the server 130) to a subscriber (e.g., the handheld device 105), allowing the publisher and subscriber to make updates while connected or disconnected, and then merging the updates between sites when they are connected. Another synchronization protocol suitable for the invention is the Red Rover middleware client 137, which is discussed in co-pending U.S. patent application Ser. No. 10/421,639, entitled "Systems and Methods for Providing Field Force Automation in Big Box Retail Environments," filed Apr. 22, 2003, and U.S. patent application Ser. No. 11/317,646, entitled "System and Method For Communicating Data Between Wireless Mobile Hand-Held Computer and a Back-End Computer System," filed concurrently herewith on Dec. 23, 2005, each of which is hereby fully incorporated herein by reference.

While step 404 is identified as a separate step in the method 400, it is apparent to one of ordinary skill in the art that in a wireless environment, step 404 can be performed in parallel with any other step in the process. That is, when the handheld device 105 has a good wireless connection to the server 130, data from the handheld device 105 can be transmitted to the server 130 or data from the server 130 can be received by the handheld device 105. It is the wireless aspect of the handheld device 105 that can allow for the real-time or nearly real-time tracking of installation or asset management by the server 130.

In step 405, the reporting module 132 of the server 130 stores the transmitted data in the database 135. The server 130 makes the stored data available to authorized users for reviewing, querying, and reporting. For example, in step 406, each authorized user, e.g., each asset holder, service representative agency, and asset vendor, can access the database 135 to monitor the service representatives' data transmissions in real-time or near real-time. Thus, the authorized users can monitor asset information, such as the status of each asset installation, in real-time or near real-time. Step 406 shows that each authorized user can generate/access a report of the stored data, e.g., via the network 120. An exemplary report is described below, in conjunction with FIG. 12.

Figure 5:
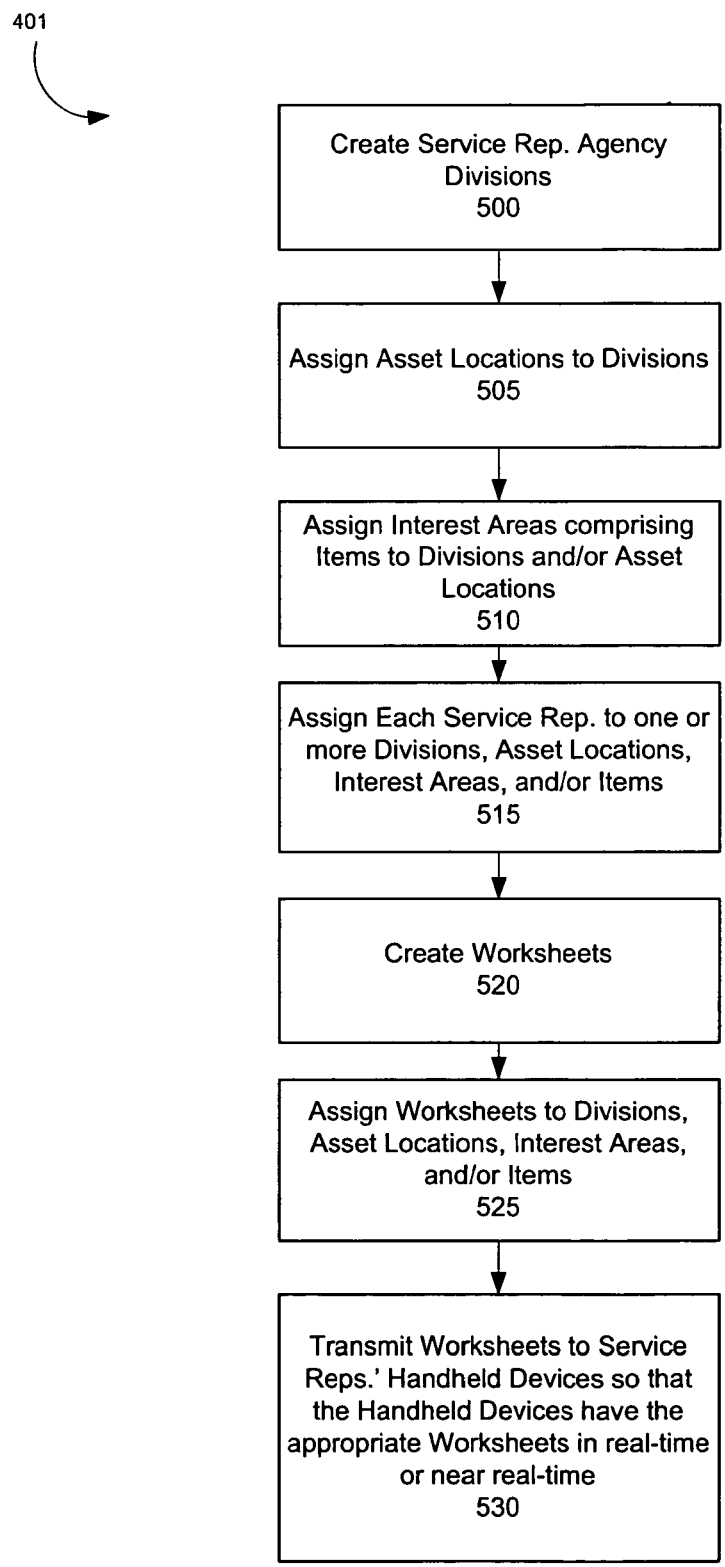
FIG. 5 is a flow chart diagram illustrating steps in a method for programming a handheld device, according to an exemplary embodiment of the invention.

FIG. 5 is a block flow diagram illustrating steps in a method 401 for programming a handheld device 105, according to an exemplary embodiment of the invention, as referred to in step 401 of FIG. 4. The exemplary method 401 is merely illustrative and, in alternative embodiments of the invention, certain steps can be performed in a different order, in parallel with one another, certain steps can be omitted entirely, and/or certain additional steps can be performed.

In step 500, a service representative agency creates service representative agency divisions. Service representative agency divisions are the major organizational structures used by the service representative agency to organize the service representatives and/or the asset locations 150, interest areas, and items that can be assigned to particular service representatives. The term "interest area" is used herein to refer generically to a subject of concern to the service representative agency, including, e.g., subject matter related to or located within an asset location 150 or a group of asset locations 150. For example, an interest area can be a type of asset 157, a type of activity that a service representative can perform on or with an asset 157, or a particular department within the asset location(s) 150. Each interest area comprises one or more items, which are particular instances of the subject of concern. For example, where the interest area is refrigerators, an item within that interest area can be a particular brand and/or type of refrigerator.

In step 505, the service representative agency assigns the asset locations 150 to the divisions created in step 500. Depending on how the service representative agency created its divisions, the service representative agency can assign each asset location 150 to one or more divisions. In addition, the service representative agency can assign multiple asset locations 150 to each division. In step 510, the service representative agency assigns the interest areas to the divisions and/or the asset locations 150. Depending on how the service representative agency created its divisions and asset locations 150, the service representative agency can assign each interest area to one or more divisions and/or asset locations 150. In addition, the service representative agency can assign multiple interest areas to each division and/or asset location 150. In step 515, the service representative agency assigns each service representative to one or more divisions, asset locations 150, interest areas, and/or items. For example, the service representative agency can assign a service representative to an asset installation division, asset locations A 150A and B 150B, refrigerator and coffee maker interest areas, and items comprising upright refrigerators and a particular brand of coffee makers.

Next, in step 520, the service representative agency and/or another authorized user, e.g., asset holders and/or asset vendors, creates one or more worksheets. The worksheets comprise one or more sequences of instructions and prompts related to an asset installation and/or an asset evaluation. The authorized users can create the worksheets by interacting, e.g., via the network 120, with the worksheet management module 134.

In certain embodiments of the invention, the worksheet management module 134 constructs the worksheets using a component-based model. The worksheet management module 134 treats pre-determined worksheet instructions and prompts as unique components and assigns each instruction and prompt with a unique identifier. Thus, the worksheet management module 134 provides each authorized user with a list (stored in the database 135 or another data storage means) of re-usable worksheet instructions and prompts to choose from in creating customized worksheets. If the authorized user elects to create a new worksheet instruction or prompt, the worksheet management module 134 can assign the new instruction or prompt with a unique identifier and add the instruction or prompt to the list of re-usable instructions and prompts.

The component-based model for the design of worksheets greatly enhances the flexibility of the reporting module 132. Authorized users can generate reports based on any component (i.e., worksheet instruction or prompt) that is common across multiple worksheets. Cross-asset vendor, cross-asset holder and cross-service representative agency reports are possible when worksheets created for particular asset vendors, asset holders, or service representative agencies include common components. As one example, a particular asset holder can specify certain "master service requirements" and dictate that any worksheets used within its asset locations 150 include certain components. The asset holder can then generate reports based on those components to determine whether its master service requirements have been met in each asset location 150. Deficient service can thus be pinpointed to a regional level, asset location level, service representative agency level and/or service representative level.

In step 525, the authorized user interacts with the worksheet management module 134, e.g., via the network 120, to assign the worksheets created in step 520 to particular divisions, asset locations 150, interest areas, and/or items. In step 530, the worksheet management module 134 transmits the worksheets, usually through a wireless link, to the service representatives' handheld devices 105 that typically communicate with the network 120 through the wireless link. The wireless link allows the worksheet management module 134 to publish the worksheets to the handheld devices 105 in real-time, after generation of the worksheets or at other designated times. In one embodiment of the invention, the scheduling module 133 of the server 130 can instruct the worksheet management module 134 to download the worksheets at the designated times. In a further embodiment of the invention, authorized users can interact with the scheduling module 133 to designate the times at which they desire each worksheet to be downloaded. One important aspect of the invention is the real-time or near real-time publication of worksheets. Such real-time or near real-time publication allows service representatives to have identical worksheets with which they can complete their work assignments in a uniform manner.

Figure 6:
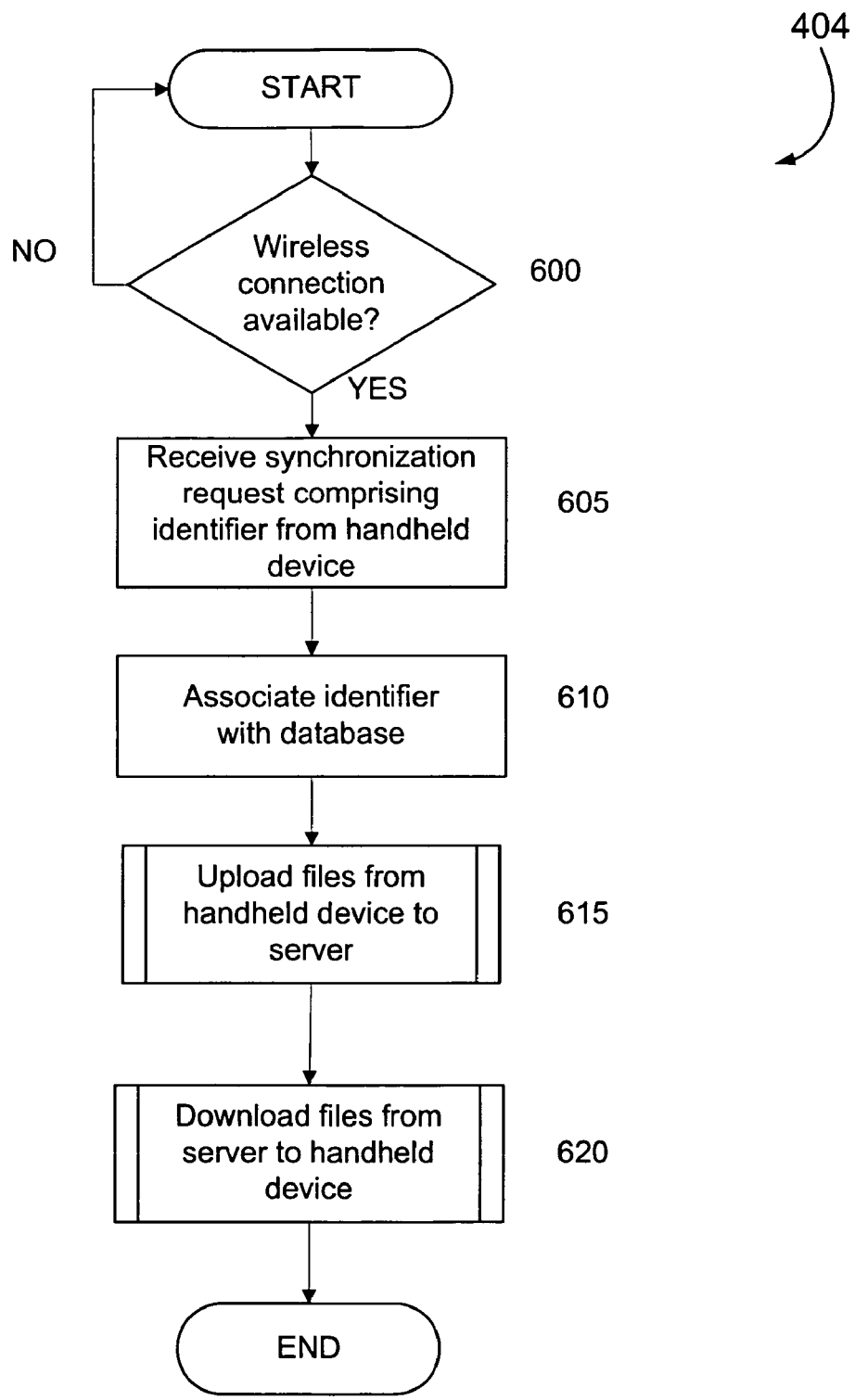
FIG. 6 is a block diagram illustrating steps in a routine for synchronizing information between the handheld device and the database utilizing the server, according to an exemplary embodiment of the invention.

FIG. 6 is a block diagram illustrating steps in a routine 404 for synchronizing information between the handheld device 105 and the database 135 utilizing the server 130, according to an exemplary embodiment of the invention, as referred to in step 404 of FIG. 4. The exemplary routine 404 is merely illustrative and, in alternative embodiments of the invention, certain steps can be performed in a different order, in parallel with one another, certain steps can be omitted entirely, and/or certain additional steps can be performed.

As previously discussed, the invention contemplates a proprietary file synchronization middleware client 137 known as Red Rover located on the server 130. The middleware client 137 is responsible for the communications between the server 130, the database 135, and the handheld device 105 in exemplary routine 404.

Either the handheld device 105 or the server 130 can initiate a synchronization request to synchronize data between the database 135 and the handheld device 105. However, to synchronize the data, a wireless connection between the handheld device 105 and the server 130 must be available. Therefore, in step 600, the handheld device 105 determines whether a wireless connection with the server 130 is available. If the handheld device 105 determines that no wireless connection is available, the routine 404 branches to step 600 to continue searching for an available wireless connection.

If the handheld device 105 determines in step 600 that a wireless connection with the server 130 is available, data synchronization between the database 135 and the handheld device 105 can occur, and the routine 404 branches to step 605. In step 605, the server 130 receives a synchronization request comprising a handheld device identifier from the handheld device 105. In step 610, the server 130 associates the handheld device identifier with the database 135. The handheld device identifier can associate the handheld device 105 and/or the service representative corresponding to the handheld device 105 with a particular group or classification in the database 135. For example, the handheld device 105 can be associated with one or more divisions, asset locations, interest areas, and/or items. These associations make it more efficient to determine the information that the sales representatives receive on their handheld devices 105.

In step 615, files are uploaded from the handheld device 105 to the server 130. Upon successful storage of each uploaded file, the server 130 transmits an acknowledgment to the handheld device 105. Upon acknowledgement, the handheld device 105 archives and/or deletes the source upload file and continues to transmit each remaining upload file following the same process. Step 615 is discussed in more detail below, with reference to FIG. 7.

After processing all upload files, the handheld device 105 downloads files from the server 130 in step 620. Step 620 is discussed in more detail below, with reference to FIG. 8. Upon completion of the uploads and downloads, the handheld device 105 disconnects from the server 130 without awaiting an acknowledgement that the files were received intact and successfully stored in the appropriate database.

Figure 7:
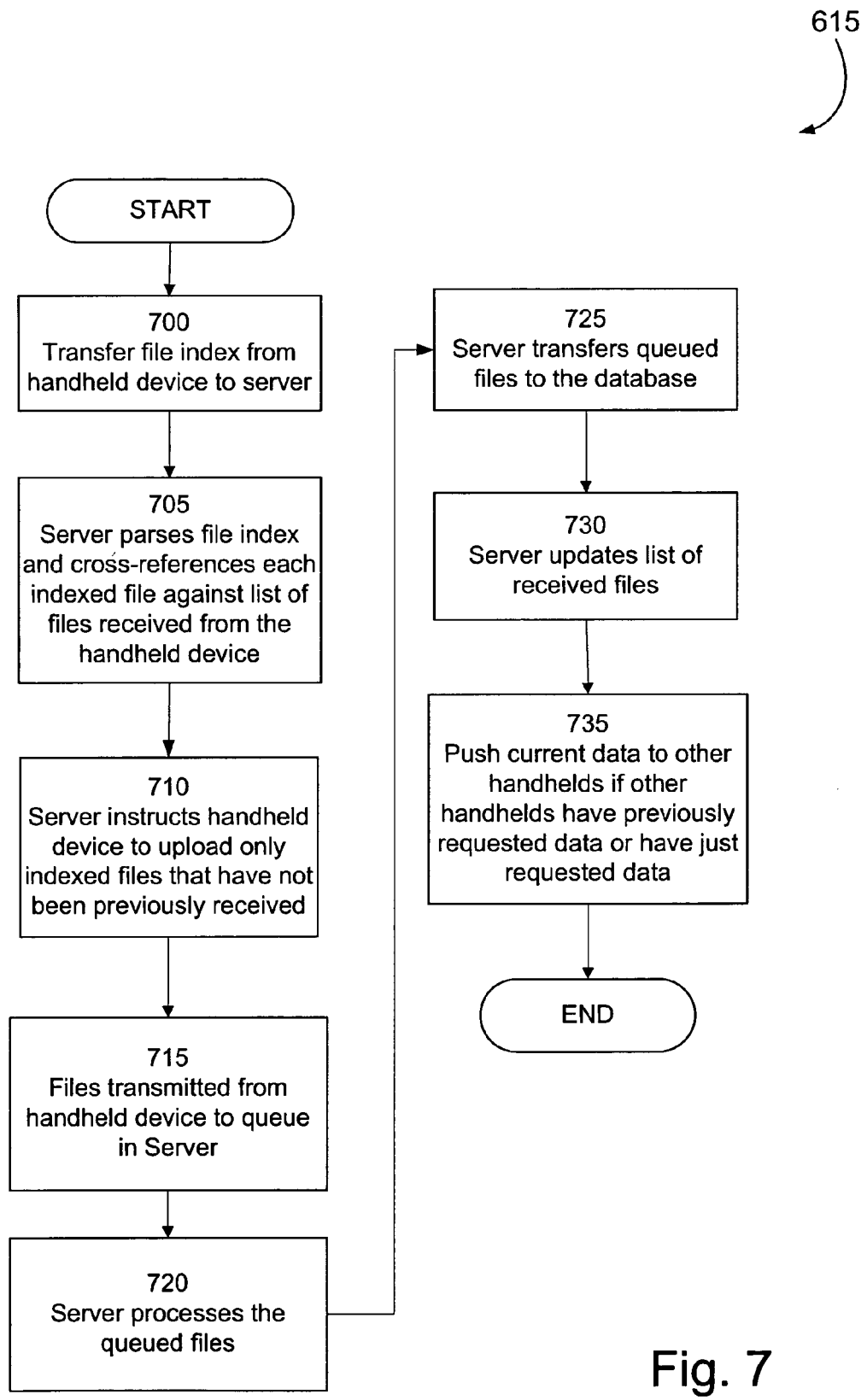
FIG. 7 is a block diagram illustrating steps in a routine for uploading data from the handheld device to the database during a synchronization routine, according to an exemplary embodiment of the invention.

FIG. 7 is a block diagram illustrating steps in a routine 615 for uploading data from the handheld device 105 to the database 135 during a synchronization routine, according to an exemplary embodiment of the invention, as referred to in step 615 of FIG. 6. The exemplary routine 615 is merely illustrative and, in alternative embodiments of the invention, certain steps can be performed in a different order, in parallel with one another, certain steps can be omitted entirely, and/or certain additional steps can be performed.

According to the middleware client 137, uploads from a handheld device 105 to the server 130 are meant to be "fast and dumb." To facilitate a rapid upload process, the middleware client 137 specifies that each handheld device 105 maintain an index of files to be uploaded to the server 130. In step 700, the index is transmitted from the handheld device 105 to the server 130 during the initial synchronization request of step 605 (FIG. 6). In step 705, the server 130 parses the index received from the handheld device 105 and cross-references each indexed file against a list of the files received from the handheld device 105. In step 710, the server 130 instructs the handheld device 105 to upload only those indexed files that have not been previously received and/or not received within a certain timeframe by the server 130.

In step 715, the handheld device 105 uploads its files to a queue on the server 130. In step 720, the server 130 processes the queued files to place them in a format understandable by the database 135. In step 725, the server 130 transfers the files to the database 135 for storage. In step 730, any files received intact from the handheld device 105 are added to the list of received files maintained by the server 130. For example, the list can be specific to the handheld device 105 (e.g., identified by a handheld identification number) and can comprise the date and time of reception for each file.

In step 735, the database 135 can communicate through the server 130 to utilize the middleware client 170 to transmit uploaded information to handheld devices that have previously requested the data or to handheld devices that have just requested the data. The transmission of the current customer information allows the handheld devices connected to the network to near real-time access to the information.

Figure 8:
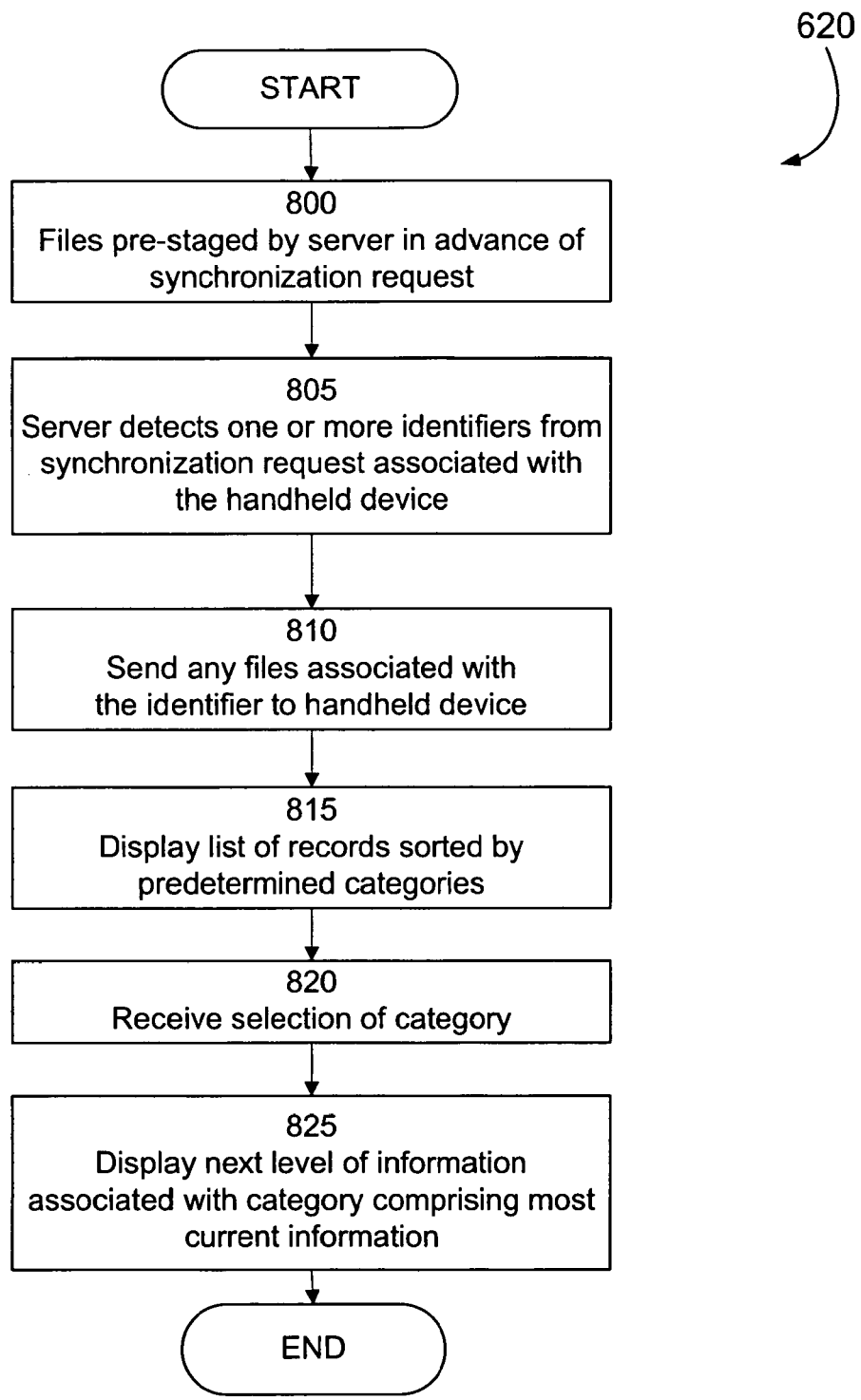
FIG. 8 is a block diagram illustrating steps in a routine for downloading data from the database to the handheld device during a synchronization routine, according to an exemplary embodiment of the invention.

FIG. 8 is a block diagram illustrating steps in a routine 620 for downloading data from the database 135 to the handheld device 105 during a synchronization routine, according to an exemplary embodiment of the invention, as referred to in step 620 of FIG. 6. The exemplary routine 620 is merely illustrative and, in alternative embodiments of the invention, certain steps can be performed in a different order, in parallel with one another, certain steps can be omitted entirely, and/or certain additional steps can be performed.

According to the middleware client 137, files downloaded from the server 130 to the handheld device 105 are staged in advance of the file synchronization request in step 605 (FIG. 6). Therefore, in step 800, the server 130 will have previously determined which files need to be downloaded to the handheld device 105 in advance of the receipt of a synchronization request. Files can be associated with particular handheld devices 105, particular groups of service representatives or service representative agencies, particular asset locations 150, etc., by assigning unique identifiers to any such entities. When a file synchronization request is received at the server 130 from a handheld device 105 in step 605 (FIG. 6), the server 130 can detect one or more identifiers associated with the handheld device 105 in step 805. In step 810, the server 130 transmits any files associated with the identifier(s) to the handheld device 105. A hierarchy of priorities for each type of identifier (e.g., handheld device ID, group ID, etc.) can be established so that file downloads can be managed at the device level and/or at the group level. A determination as to whether to download a file to a handheld device 105 can be based on the "last change" date of the file and/or the date the file was last sent to the handheld device 105. Of course, such dates can be ignored in an appropriate case and all files associated with the identifier(s) of the handheld device 105 can be downloaded.

After receiving the files in step 810, the handheld device 105 sorts and displays the information in the files in predetermined categories in step 815. For example, the categories and/or display format can be based on the software of the handheld device 105 and/or preferences set by the service representative or the service representative agency. In step 820, the service representative selects which categories of information to view on the handheld device 105. For example, the service representative can choose to view certain asset installation worksheets. In step 525, the handheld device 105 displays the next level of information associated with the particular category comprising the most current information available.

FIG. 9 is an illustration of a worksheet 900 related to an asset evaluation, generated in accordance with an exemplary embodiment of the invention. The worksheet 900 is merely illustrative and, in alternative embodiments of the invention, certain elements of the worksheet 900 can be altered, certain elements can be omitted entirely, and/or certain additional elements can be included.

The worksheet 900 comprises a series of instructions and prompts related to an asset evaluation. The prompts can comprise, e.g., a question or a request for information. For example, each prompt can be (1) a yes or no question with no follow-up; (2) a yes or no question with a follow-up on a no response; (3) a yes or no question with a follow-up on a yes response; (4) a yes or no question with a follow-up on either a yes or a no response; (5) a request for selection of one or more choices from a set of choices; (6) a request for free-form text, such as a typed or scanned data entry; (7) a request for a digital picture; (8) a request for a list of distinct textual items; or (9) a request for a digital signature. Other types of questions and requests for information will be apparent to one of ordinary skill in the art.

Once published to a service representative's handheld device 105, the worksheet 900 is the working document that the service representative uses to gather data about the asset evaluation and/or the asset being evaluated.

FIG. 10 is an illustration of a worksheet 1000 related to asset installation and asset evaluation, generated in accordance with an exemplary embodiment of the invention. The worksheet 1000 is merely illustrative and, in alternative embodiments of the invention, certain elements of the worksheet 1000 can be altered; certain elements can be omitted entirely; and/or certain additional elements can be included.

The worksheet 1000 comprises a series of instructions and prompts related to installation of a coffee machine and evaluation of a dish washer. Once published to a service representative's handheld device 105, the worksheet 1000 is the working document that the service representative uses to gather data about the asset installation, the asset evaluation and/or the asset being evaluated.

Figure 11:
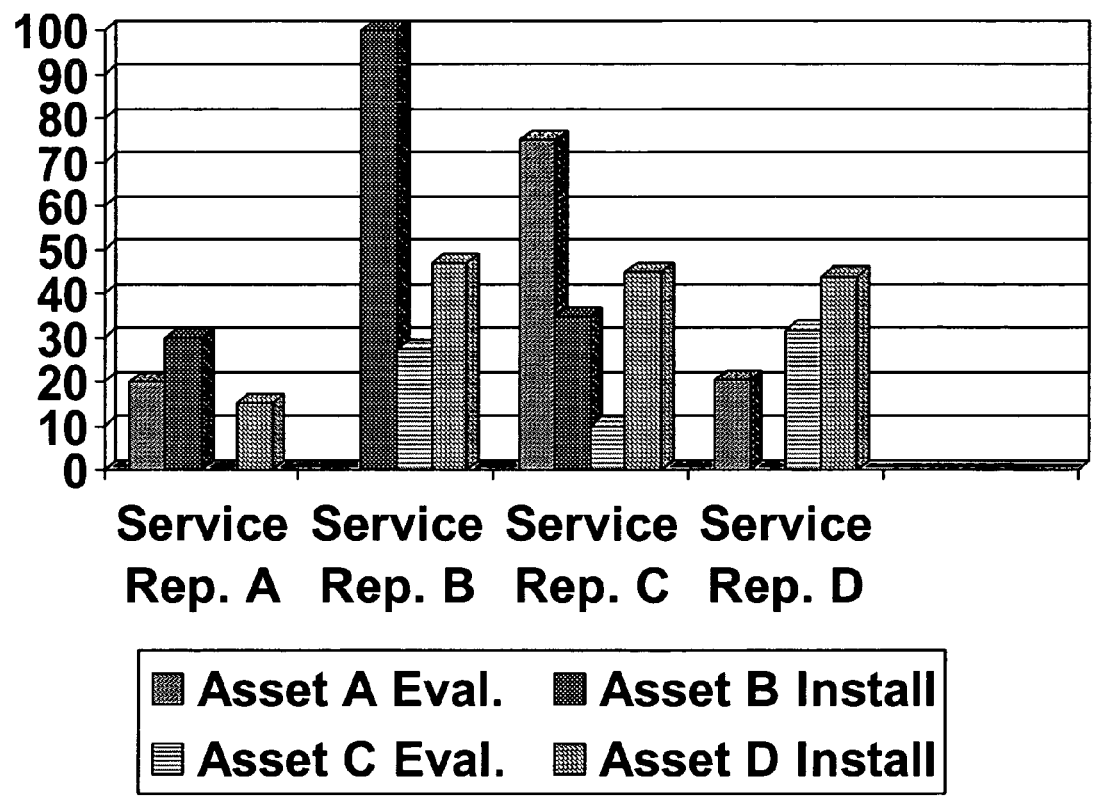
FIG. 11 is an illustration of a bar chart indicating relative service representative performance of asset installations and evaluations, generated in accordance with an exemplary embodiment of the invention.

FIG. 11 is an illustration of a bar chart 1100 indicating relative service representative performance of asset installations and evaluations, generated in accordance with an exemplary embodiment of the invention. The bar chart 1100 is merely illustrative and, in alternative embodiments of the invention, certain elements of the bar chart 1100 can be altered, certain elements can be omitted entirely, and/or certain additional elements can be included.

As set forth above, authorized users, e.g., asset holders, asset vendors, and/or service representative agencies, can generate reports based on data collected by service representatives during asset installations and/or asset evaluations. Handheld devices of the service representatives can transmit the data, e.g., via a wireless network, to a server for storage, querying, and/or report generation. By accessing a reporting module of the server, e.g., via a network, the authorized users can obtain real-time or near real-time information about the service representatives' performance.

Among the types of information that the authorized users can obtain is information regarding the relative performance of the service representatives. The bar chart 1100 of FIG. 11 exemplifies one embodiment of such information. The bar chart 1100 illustrates, in percentage form, the relative progress of each of four service representatives, who have evaluated/installed various assets. As illustrated in the bar chart 1100, Service Representative A is approximately 20% complete with his evaluation of Asset A, 30% complete with his installation of Asset B, and 15% complete with his installation of Asset D. By tracking, in real-time (or near real-time), the status of asset installations and/or the results of asset evaluations, asset holders can maintain accurate budgets and accounting documents based on exact asset values, asset replacement costs, and/or asset installation/evaluation costs.

In one embodiment of the invention, the authorized users can track service representative performance at the instruction/prompt level. For example, with regard to Service Representative A's evaluation of Asset A, the authorized users can determine which instructions/prompts Service Representative A has completed and which instructions/prompts Service Representative A has not yet completed. Tracking performance at such a level can be particularly helpful, for example, if a service representative quits, is fired, is injured, or otherwise is unwilling or unable to complete a particular asset installation/evaluation. By knowing in real-time (or near real-time) which instructions/prompts remain to be completed, the service representative agency, for example, can readily deploy another service representative to continue the installation/evaluation where the previous service representative left off.

FIG. 12 is an illustration of a report 1200 related to an asset evaluation, generated in accordance with an exemplary embodiment of the invention. The report 1200 is merely illustrative and, in alternative embodiments of the invention, certain elements of the report 1200 can be altered; certain elements can be omitted entirely; and/or certain additional elements can be included.

The report 1200 is a table comprising information generated from data collected by a service representative during an asset evaluation. The grouping column 1211 comprises indicators for whether each row in the column comprises detailed information about the collected data or rather, summary information about the collected data. Each row comprising a detail indicator 1220 in the grouping column 1211 comprises detailed information. Each row comprising a ˆsheet summary indicator 1221 in the grouping column 1211 comprises summary information. The worksheet column 1212 indicates to which worksheet the data in each row corresponds. In other words, the worksheet column 1212 indicates the worksheet that the service representative worked with in generating the data displayed in each row. The box type column 1213 indicates the type of asset to which the data in each row corresponds. The model column 1214 indicates the model of the asset to which the data in each row corresponds. The asset number column 1214 indicates the asset number of the asset to which the data in each row corresponds. The length column 1216 indicates the length of the asset to which the data in each row corresponds.

The report 1200 comprises information generated based upon data submitted by a service representative in conjunction with the service representative's performance of an asset evaluation. In performing the asset evaluation, the service representative followed instructions, and responded to prompts, displayed on his handheld device. The instructions and prompts were from an "Upright ID and Condition" worksheet. The asset being evaluated was an Upright-Hobart Asset, Model qfl/q; Asset No. 11593, with length 54.

During the asset evaluation, the service representative noted on his handheld device, in response to the instructions/prompts, whether the asset requires any repairs. The term "repair" is used generically herein to refer to any restoration of an asset to sound condition or sound placement, or any other temporary or permanent characteristic of the asset that can affect the asset's value. For example, the service representative can note whether the asset has suffered any damage or whether the asset was made by a particular manufacturer. The repairs column 1217 comprises information about each type of repair for which the service representative evaluated the asset. The quantity/description column 1218 comprises notes and other information from the service representative to indicate whether the asset requires, or otherwise meets the requirements for, each type of repair.

For each noted repair, the reporting module inserts an estimated repair cost 1207 into the report 1200. In one embodiment of the invention, each authorized user, e.g., the asset holder, asset vendor, and/or service representative agency, can customize the estimated repair costs 1207. For example, when generating a customized worksheet, the authorized user can designate an estimated repair cost 1207 for each anticipated response. From the estimated repair costs 1207, the reporting module can insert into the report 1200 a total estimated repair cost 1210 for the evaluated asset. An authorized user can utilize the total estimated repair cost 1210, e.g., to determine whether to replace or dispose of the evaluated asset.

In one embodiment of the invention, the report 1200 can comprise a link 1205 to a report, webpage, or other document, comprising the instructions and prompts displayed to the service representative, along with the responses (to the instructions and prompts) supplied by the service representative. The report number column 1219 comprises report identification information identifying the report, webpage, or other document comprising the instructions, prompts, and responses on which the data in each row is based.

Figures 1, 2, 13:
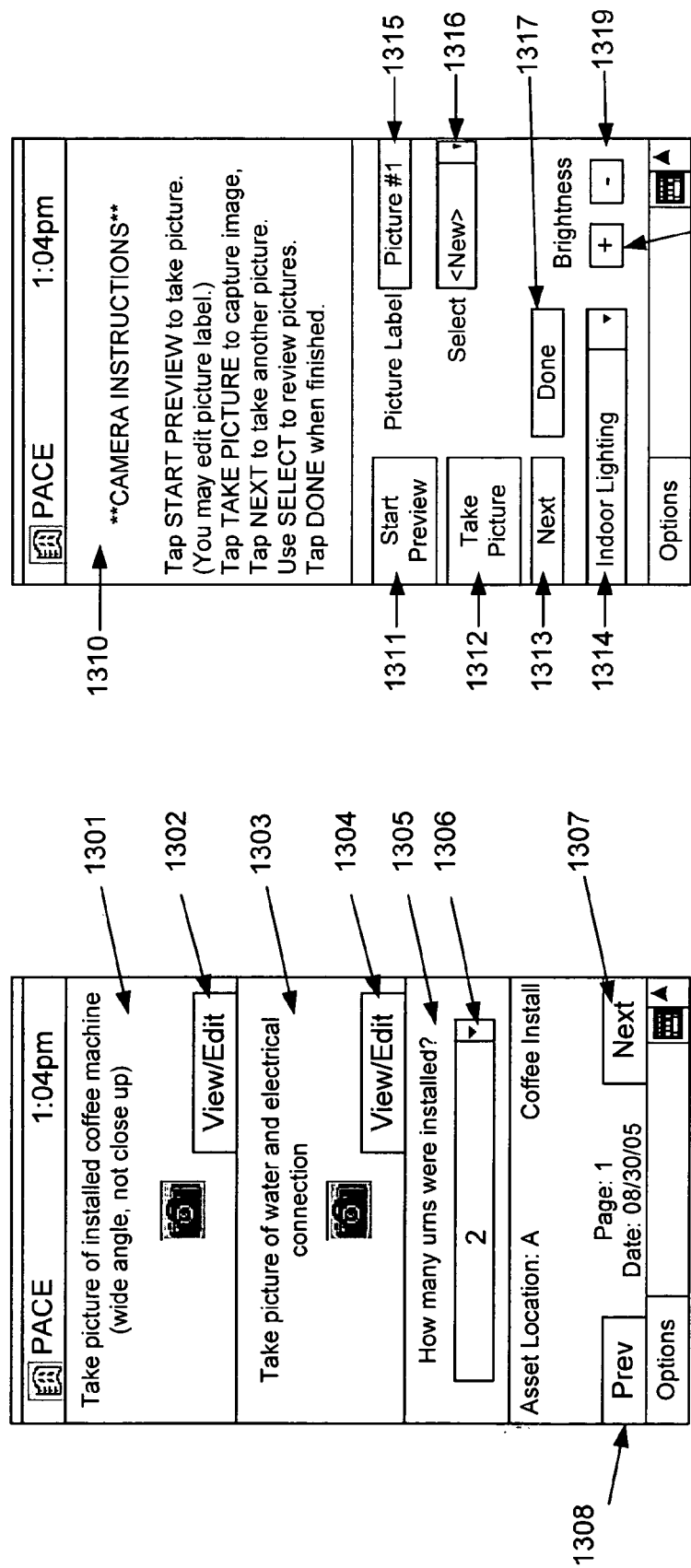
FIG. 13, comprising
Figures 3, 13:
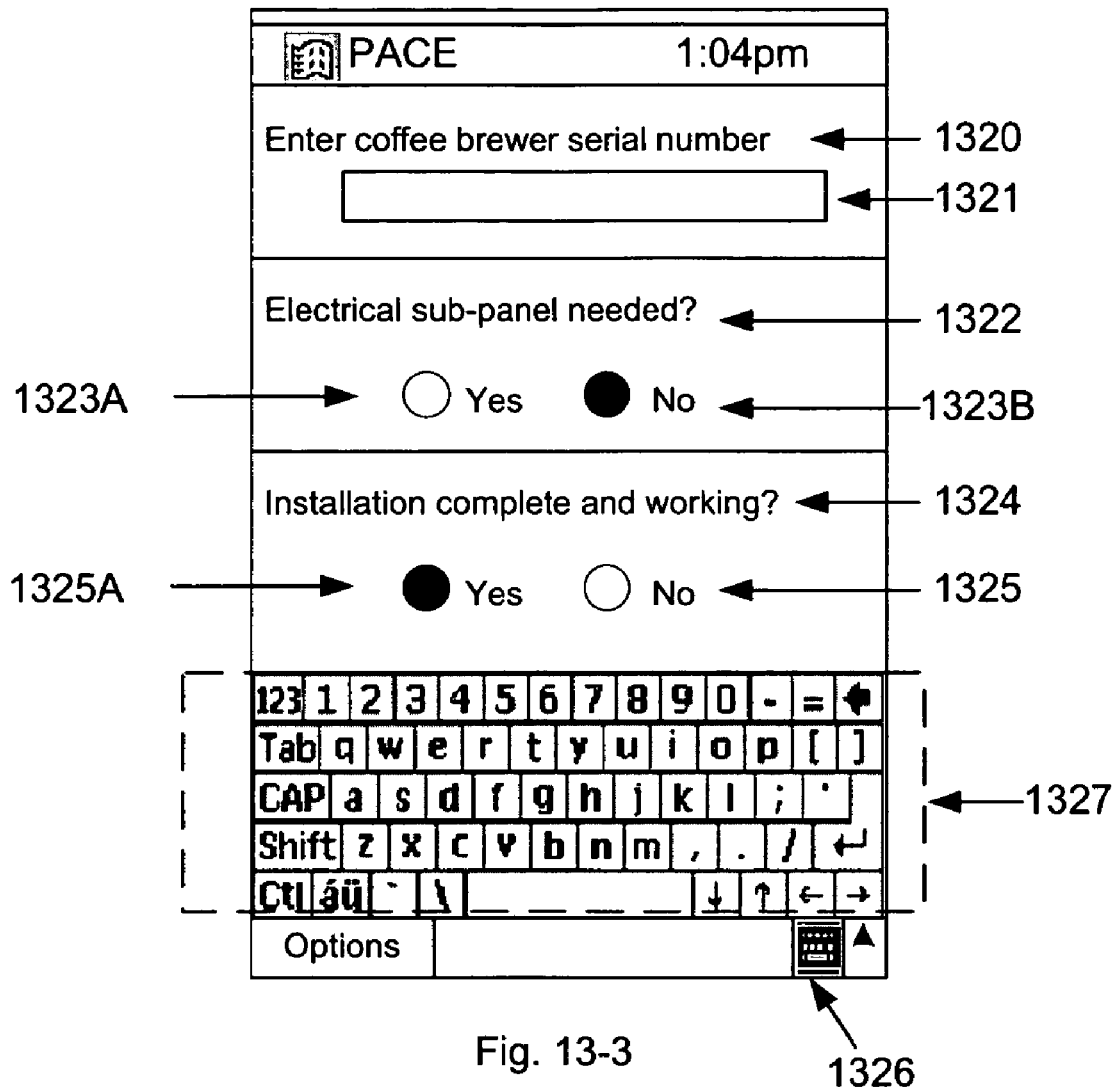

FIG. 13, comprising FIGS. 13-1 thru 13-3, illustrates exemplary screen displays which provide a demonstration of the functionality of the handheld device 105 in accordance with an exemplary embodiment of the invention. Each of FIGS. 13-1 thru 13-3 illustrates a display screen 107 of a handheld device 105. The display screen 107 comprises a sequence of instructions and prompts related to a coffee maker (asset) installation. In performing the coffee maker installation, a user (service representative) can perform the displayed instructions and respond to the displayed prompts.

FIG. 13-1 comprises a sequence of instructions and prompts 1301-1304 related to capturing images during the installation. The user can capture the images and activate a view/edit icon 1302, 1304 to view each captured image and/or to edit each captured image. FIG. 13-1 further comprises a prompt 1305 for the user to determine a number of coffee urns installed during the installation. Through a drop-down box 1306, the user can select the correct number of installed coffee urns. FIG. 13-1 further comprises menu icons 1307-1308 by which the user can traverse various worksheets. For example, the user can activate a "prev" icon 1308 to view a previously-viewed worksheet. Alternatively, the user can activate a "next" icon 1307 to view the next worksheet in a sequence of worksheets.

Similar to FIG. 13-1, FIG. 13-2 comprises a sequence of instructions and prompts related to capturing images during the installation. For example, FIG. 13-2 comprises a set of instructions 1310 for how to use the camera 115 of the handheld device 105. The user can activate the "Start Preview" icon 1311 to capture a preview of an image to be captured by the camera 115. The user can label the image to be captured by entering text, e.g., via a keyboard or pointing device 113, into a "Picture Label" field 1315. The user can activate the "Take Picture" icon 1312 to capture the image. The user can activate the "Next" icon 1313 to capture another image. To review the captured image(s), the user can activate a selection in a "Select" drop-down box 1316. To adjust the lighting or brightness of a captured image, the user can activate an "Indoor Lighting" drop-down box 1314 or a "Brightness +" or "Brightness –" icon, respectively.

FIG. 13-3 comprises a sequence of instructions and prompts for capturing information related to the coffee installation. In response to an "Enter coffee brewer serial number" instruction and prompt 1320, the user can type the coffee brewer serial number into a serial number field 1321. By activating a keyboard icon 1326, the user can view a virtual keyboard 1327 on the display screen 107 of the handheld device 105. For example, via a pointing device 1313, the user can select letters, numbers, and/or symbols on the virtual keyboard 1327 to enter the coffee brewer serial number in the serial number field 1321. In response to an "Electrical sub-panel needed?" prompt 1322, the user can activate either a "Yes" button 1323A or a "No" button 1323B. Similarly, in response to an "Installation complete and working?" prompt 1324, the user can active either a "Yes" button 1325A or a "No" button 1325B.

Figure 14:
FIG. 14 is an illustration of a report summarizing the results of multiple asset installations.

FIG. 14 is an illustration of a report 1400 summarizing the results of multiple asset installations. The information displayed in the report 1405 allows an authorized user to track the relative progress and results of the service representatives and service representative agencies.

The report 1400 indicates that Service Representative Agency A was requested to perform 997 coffee installations. Service representatives from Service Representative Agency A completed installations at 839 of the 997 requested asset locations between Feb. 1, 2005 and Aug. 30, 2005. For the 839 serviced asset locations, the report 1400 includes a summary chart 1405 summarizing the results of the asset installations. The results relate to questions displayed to the service representatives on a "Coffee Install" worksheet. The first question is whether an electrical sub-panel is needed. The summary chart 1405 indicates that, of the 839 responses received from the service representatives, 15, or 1.24%, of the responses were positive and 824, or 98.2%, of the responses were negative. The second question is whether the installation is complete and working. The summary chart 1405 indicates that, of the 839 responses received from the service representatives, 809, or 96.4%, of the responses were positive and 30, or 3.6%, of the responses were negative.

In conclusion, the foregoing exemplary embodiments enable a more efficient and effective approach to managing asset installation and asset evaluation. By providing a network based application through which authorized users can instantly (or nearly instantly), uniformly implement service methodologies and timely monitor service representative performance and service results, asset holders, asset vendors, and/or service representative agencies can more readily manage asset installation and asset evaluation.

It will be appreciated that the exemplary embodiments of the invention overcome the limitations of the prior art. From the description of the exemplary embodiments, equivalents of the elements shown therein and ways of constructing other embodiments of the invention will be apparent to practitioners of the art. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention as defined by the following claims. It should also be understood that the invention is not restricted to the illustrated embodiments and that various modifications can be made within the scope of the following claims.

What is claimed is:

1. A method for managing and evaluating a plurality of assets comprising:

for a first asset of the plurality of assets:
generating on a mobile computing device a sequence of prompts for producing worksheet data, wherein the sequence of prompts include a prompt to enter a serial number of the first asset into a field, a question of whether or not a particular component of the first asset is needed, a question of whether or not installation of the first asset is complete and working, and a prompt to take a digital image of the first asset and digital image of an asset tag for the first asset;
receiving a signal indicating that a service representative has arrived at an asset location for the first asset to perform an installation of the first asset;
receiving the worksheet data comprising responses to the prompts on the mobile computing device;
synchronizing the worksheet data with a server, wherein the synchronizing includes:
sending a file index over a wireless network before any of the worksheet data is transmitted over the wireless network from the mobile computing device to a server;
parsing with the server each file index received from the wireless network;
cross-referencing each indexed file with the server against a list of files stored at the server and received previously from the mobile computing device;
instructing the mobile computing device to send only files that have not been received previously by the server; and uploading files that have not been previously received by the server, including the worksheet data, from the mobile computing device to the server;

repeating the above steps for each of the remainder of the plurality of assets; and evaluating the worksheet data for each of the plurality of assets and generating a report based on the evaluating, wherein the report includes a summary chart that indicates, for ones of the plurality of assets, the responses comprising positive and negative values that assist in determining whether or not a particular component of the asset is needed and whether or not installation of the asset is complete and working.

2. The method of claim 1, wherein the mobile computing device comprises a handheld mobile computing device.

3. The method of claim 1, transmitting each of the prompts to a plurality of mobile computing devices over a wireless network.

4. The method of claim 1, wherein the wireless network comprises a radio-frequency (RF) wireless network.

5. The method of claim 1, further comprising determining if the wireless network is available.

6. The method of claim 1, wherein the report displays a visual indicator of progress for an installation of at least one of the plurality of assets.

7. The method of claim 6, wherein the report comprises an estimated repair cost for at least one of the plurality of assets.

8. A system of managing and evaluating a plurality of assets comprising:

for a first asset of the plurality of assets:

a server operable to transmit data for display on a mobile computing device and to produce a sequence of prompts for producing worksheet data, wherein the sequence of prompts include a prompt to enter a serial number of the first asset into a field, a question of whether or not a particular component of the first asset is needed, a question of whether or not installation of the first asset is complete and working, and a prompt to take a digital image of the first asset and digital image of an asset tag for the first asset; and the mobile computing device operable to:

receive the worksheet data comprising responses to the prompts on the mobile computing device;

send a file index over a wireless network before any of the worksheet data is transmitted over the wireless network to the server;

the server further operable to:

parse each file index received from the wireless network;

cross-reference each indexed file against a list of files stored at the server and received previously from the mobile computing device; and instruct the mobile computing device to send only files that have not been received previously by the server;

the mobile computing device further operable to:

upload files that have not been previously received by the server, including the worksheet data, to the server, whereby the worksheet data is synchronized between the mobile computing device and the server;

the server and mobile computing device operable to perform the above respective steps for each of the remainder of the plurality of assets; and the mobile computing device further operable to interact with a reporting module of the server to:

evaluate the worksheet data for each of the plurality of assets and generate a report based on the evaluating, wherein the report includes a summary chart that indicates, for ones of the plurality of assets, the responses comprising positive and negative values that assist in determining whether or not a particular component of the asset is needed and whether or not installation of the asset is complete and working.

9. The system of claim 8, wherein the server is operable to transmit each of the prompts to a plurality of mobile computing devices over a wireless network.

10. The system of claim 9, wherein the wireless network comprises a radio-frequency (RF) wireless network.

11. The system of claim 10, wherein the mobile computing device is operable to determine if the wireless network is available.

12. The system of claim 11, further wherein the report displays a visual indicator of progress for an installation of at least one of the plurality of assets.

13. The system of claim 12, wherein the report comprises an estimated repair cost for at least one of the plurality of assets.

* * * * *